United States Patent
Liu et al.

(10) Patent No.: US 9,014,711 B2
(45) Date of Patent: Apr. 21, 2015

(54) COMMUNICATION SYSTEM, COMMUNICATION METHOD, BASE STATION, USER EQUIPMENT, AND THEREIN PROGRAM

(75) Inventors: Le Liu, Tokyo (JP); Yoshikazu Kakura, Tokyo (JP)

(73) Assignee: NEC Corporation, Tokyo (JP)

( * ) Notice: Subject to any disclaimer, the term of this patent is extended or adjusted under 35 U.S.C. 154(b) by 508 days.

(21) Appl. No.: 13/496,175

(22) PCT Filed: Sep. 15, 2009

(86) PCT No.: PCT/JP2009/004616
§ 371 (c)(1),
(2), (4) Date: Mar. 14, 2012

(87) PCT Pub. No.: WO2011/033556
PCT Pub. Date: Mar. 24, 2011

(65) Prior Publication Data
US 2012/0178484 A1    Jul. 12, 2012

(51) Int. Cl.
*H04W 72/04* (2009.01)
*H04B 7/00* (2006.01)
*H04J 11/00* (2006.01)

(52) U.S. Cl.
CPC ................... *H04J 11/0053* (2013.01)

(58) Field of Classification Search
CPC .............................. H04W 72/04; H04W 72/06
USPC ........ 455/513, 509, 452.1, 422.1, 450, 452.2, 455/458, 463, 500, 67.11; 370/254
See application file for complete search history.

(56) References Cited

U.S. PATENT DOCUMENTS

| | | | |
|---|---|---|---|
| 2002/0145988 A1 | 10/2002 | Dahlman et al. | |
| 2004/0228349 A1 | 11/2004 | Vrzic et al. | |
| 2011/0098054 A1* | 4/2011 | Gorokhov et al. | 455/452.1 |
| 2013/0294288 A1* | 11/2013 | Choi et al. | 370/254 |

FOREIGN PATENT DOCUMENTS

| | | |
|---|---|---|
| CN | 101483873 A | 7/2009 |
| GB | 2 415 327 A | 12/2005 |
| JP | 2005006358 A | 1/2005 |
| JP | 2008537442 A | 9/2008 |
| JP | 2010154262 A | 7/2010 |
| WO | 2006113009 A1 | 10/2006 |

OTHER PUBLICATIONS

Office Action, dated Sep. 11, 2013, issued by the Japanese Patent Office, in counterpart Application No. 2012513794.
"3GPP TSG RAN WG1 Meeting #55", R1-084173, Nov. 10-14, 2008, pp. 1-5, Prague Czech Republic.

(Continued)

*Primary Examiner* — John J Lee
(74) *Attorney, Agent, or Firm* — Sughrue Mion, PLLC

(57) ABSTRACT

The object of the present invention is to provide a technology of deciding CoMP point dynamically by considering the spectrum efficiency after channel-dependent scheduling with different possible combinations of CoMP points. According to the present invention, A wireless communication system, characterized in deciding number of CoMP (coordinated multipoint transmission and reception) point to a user equipment by using information related to scheduling.

22 Claims, 13 Drawing Sheets

(56) References Cited

OTHER PUBLICATIONS

"3GPP TSG RAN WG1 Meeting #56bis", R1-091484, Mar. 23-27, 2009, pp. 1/8-8/8, Seoul Korea.

"3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 v8.7.0, Sep. 2009, pp. 1-208.

"3rd Generation Partnership Project; Technical Specification Group Radio Access Network; Evolved Universal Terrestrial Radio Access (E-UTRA); Physical layer procedures (Release 8)", 3GPP TS 36.213 v8.7.0, May 2009, pp. 1-39.

"3rd Generation Partnership Project; Technical Specification Group Radio Access Network; Further Advancements for E-UTRA Physical Layer Aspects (Release 9)", 3GPP TR 36.814 vol. 4.1, Feb. 1, 2009, pp. 1-31.

"3rd Generation Partnership Project; Technical Specification Group Radio Access Network; Requirements for further advancements for Evolved Universal Terrestrial Radio Access (E-UTRA) (LTE-Advanced) (Release 8)", 3GPP TR 36.913 v8.0.1, Mar. 2009, pp. 1-8.

International Search Report, PCT/JP2009/004616, Jul. 13, 2010.

Search Report, dated Mar. 5, 2014, issued by the State Intellectual Property Office of the People's Republic of China, in counterpart Application No. 200980161484.5.

"3rd Generation Partnership Project; Technical Specification Group Radio Access Network; Potential gain of DL CoMP with joint transmission", 3GPP TSG RAN WG1 Meeting #57, R1-091688, May 4-8, 2009; 5 pages total.

* cited by examiner

COMMUNICATION SYSTEM, COMMUNICATION METHOD, BASE STATION, USER EQUIPMENT, AND THEREIN PROGRAM

CROSS REFERENCE TO RELATED APPLICATIONS

This application is a National Stage of International Application No. PCT/JP2009/004616 filed Sep. 15, 2009, the contents of all of which are incorporated herein by reference in their entirety.

TECHNICAL FIELD

The present disclosure relates generally to communications and, more specifically, to a technology for CoMP (coordinated multipoint transmission and reception) point decision for coordinated multipoint transmission used in a cellular system.

BACKGROUND ART

To meet demand for high speed wireless access beyond 3G cellular system, E-UTRA (Evolved UMTS Terrestrial Radio Access) has been standardized as LTE (Long Term Evolution) radio access in 3GPP (3rd Generation Partnership Project). Since March 2008, 3GPP has started standardization of IMT-Advanced as LTE-Advanced. The target peak rate of LTE-Advanced is 1 Gbps and 500 Mbps for downlink and uplink, respectively [1]. The higher spectrum efficiency compared to LTE is also required. At the same time, LTE-Advanced should consider backward compatibility with rel.8 LTE as it is developed as the enhancement of LTE.

Downlink CoMP is considered as a key technique to improve the cell-edge throughput and/or to increase system throughput for 3GPP LTE-Advanced [2].

100 and 200 in FIG. 1 show the examples of downlink (DL) transmission without CoMP (w/o CoMP) and with CoMP (w/CoMP), respectively. In FIG. 1, only point 1(101) is evolved in transmission for the UE (user equipment) 104. The UE 104 receives the signal from point 1 but interferences from point 2(102) and point 3(103). However, in 200, three points, i.e., point 1(201), point 2(202), and point 3(203) are involved in coordinated transmission. We use "CoMP point" to indicate the point involved in coordinated transmission, which can be eNode-B (eNB), cell, or other type of node, such as remote antennas connected by optical fiber [3]. A "CoMP UE" is the UE who has more than one CoMP points.

Joint transmission and coordinated scheduling/coordinated beamforming for downlink CoMP have been agreed as candidate schemes for LTE-Advanced [2]. In both cases, multiple CoMP points allocate resource blocks (RBs) with same spectrum positions. In case of joint transmission, multiple CoMP points transmit data simultaneously to CoMP UE 204. As shown in the example of 200, the UE 204 is a CoMP UE. The interference from point 2(202) and point 3(203) are transformed into signals to improve the received signal for the CoMP UE 204. The CoMP gain in terms of the signal-to-interference plus noise ratio (SINR) comes from the diversity gain of all CoMP points, i.e., point 1(201), point 2(202) and point 3(203). However, in case of coordinated scheduling, only CoMP point 1(201) is transmitting data to CoMP UE 204 and the interferences from CoMP point 2(202) and 3(203) are cancelled. The CoMP gain in terms of SINR comes from the interference avoidance of CoMP point 2(202) and 3(203).

How to select CoMP points has great impact on CoMP gain in terms of cell-edge user throughput and average sector throughput. The CoMP gain may be limited when CoMP points are not properly selected to include the potential strong received signal for joint processing or to mitigate the strong interference for coordinated scheduling.

Conventional method to select CoMP point is to use fixed CoMP points to calculate and rank the PF metric (proportional fairness metric) for channel-dependent scheduling. For example, FIG. 2 illustrates the flowchart of conventional method carried out in the scheduler, which is described as follows:

In Step 1, the scheduler receives the UE feedback. The UE feedback includes the UE measured long-term averaged channel information, such as reference signal received power (RSRP) used in [3] or geometry in [4]. RSRP, is determined for a considered cell as the linear average over the power contributions (in [W]) of the resource elements that carry cell-specific reference signals within the considered measurement frequency bandwidth. The geometry is the average signal-to-interference plus noise ratio (SINR) in the presence of shadowing and path loss.

Besides above information, the UE feedback also includes the channel quality indicator (CQI), which is used to indicate the variation of channel state over bandwidth the measured channel state on each RB over RS bandwidth. For example, in LTE, the feedback period for RSRP can be 120~200 ms, etc. [5]; while, the feedback period for CQI can be 2 ms, 5 ms, 10 ms, etc. [6].

In Step 2, the cell (or other types of points) ranking is carried out for each UE. For each UE, the cells (points) are ranked as follow.

$$X_{m,\delta} \geq X_{m,1} \geq X_{m,2} \ldots$$

where
$X_{m,\delta}$ is the uth UE feedback RSRP or geometry of the δth cell in dB, obtained from Step 1.

In Step 3, the candidate CoMP point is selected for each UE and the UE who has more than one candidate CoMP points is regarded as a candidate CoMP UE. For the uth UE, the point with highest $$X_{m,\delta}$$

is selected as the serving cell, which is always a CoMP point. Besides the serving cell, the cell with its $$X_{m,\delta} \geq X_{m,0} - \text{Threshold}$$

is also selected as a candidate CoMP point, where Threshold is pre-defined parameter in dB. For example, with low threshold, only the UEs close to the cell edge may be set as a candidate CoMP UE, who is able to make use of CoMP to improve its throughput.

The Step 4 includes step 306, 307 and 308. In step 306, for each candidate CoMP UE, N points among candidate CoMP points are fixed as CoMP points. Accordingly, a candidate CoMP UE is decided as a CoMP UE when N>1 CoMP points are selected; otherwise, when N=1, a candidate CoMP UE reduces to a non-CoMP UE.

After deciding CoMP points, in step 307, the scheduling metric is calculated and ranked for the preparation of channel-dependent scheduling. For a CoMP UE, the CQI improved by CoMP with fixed N CoMP points is used for metric calculation; while, for the other UE, the CQI without CoMP (N=1) is used.

In step 308, the RBs are allocated for all UEs. The resource allocation is carried out based on the metric ranking. When the UE has N>1 CoMP points, the channel-dependent scheduling allocates the resource blocks with same spectrum positions at each CoMP point.

In the final Step 5, the scheduler informs the scheduling result to the UEs, e.g., the positions and number of allocated RBs.

CITATION LIST

Non Patent Citation

[PTL 1] 3GPP, TR36.913 (V8.0.1), "Requirements for Further Advancements for E-UTRA (LTE-Advanced)," June 2008
[PTL 2] 3GPP, TR36.814 (V1.0.0), "Further Advancements for E-UTRA Physical Layer Aspects"
[PTL 3] R1-091484, NTT DOCOMO, 3GPP TSG-RAN WG1 #56bis, March 23, 27, 2009
[PTL 4] R1-084173, Samsung, 3GPP TSG-RAN WG1 #55, Nov. 10-14, 2008
[PTL 5] 3GPP, TS 36.331(V8.7.0)
[PTL 6] 3GPP, TS 36.213(V8.4.0)

DISCLOSURE OF INVENTION

Technical Problem

Though the number of CoMP point(s) is dynamic depending on neighboring circumstances of the base station, conventional method sets fixed the number of CoMP point(s) for scheduling metric ranking and resource allocation. When the UE has N>1 CoMP points, the channel-dependent scheduling uses the improved CQI by using CoMP and allocates the RBs with the same spectrum position at each CoMP point. By using common RBs at N CoMP points, the achievable rate of CoMP UE is increased due to the improved CQI. However, when the instantaneous achievable rate with CoMP is not large enough, that is, smaller than N times of that without CoMP, the spectrum efficiency (rate-to-spectrum ratio) is decreased. Therefore, the problem of conventional method is that the fixed N CoMP point(s) doesn't consider whether the spectrum efficiency after channel-dependent scheduling is increased or not.

We intend to dynamically decide CoMP point and efficiently allocate resource blocks by considering the spectrum efficiency after channel-dependent scheduling with different possible combinations of CoMP points.

Solution of Reference

The 1st invention for solving the above-mentioned problems, which is a wireless communication system, characterized in deciding number of CoMP (coordinated multipoint transmission and reception) points to a user equipment by using information related to scheduling.

The 2nd invention for solving the above-mentioned problems, which is a base station, characterized in deciding number of CoMP (coordinated multipoint transmission and reception) points to a user equipment by using information related to scheduling.

The 3rd invention for solving the above-mentioned problems, which is a user equipment, characterized in communicating to use decided number of CoMP (coordinated multipoint transmission and reception) points based on using information related to scheduling by a base station.

The 4th invention for solving the above-mentioned problems, which is a coordinator, characterized in deciding number of CoMP (coordinated multipoint transmission and reception) points to a user equipment by using information related to scheduling.

The 5th invention for solving the above-mentioned problems, which is a wireless communication method, characterized in deciding number of CoMP (coordinated multipoint transmission and reception) points to a user equipment by using information related to scheduling.

The 6th invention for solving the above-mentioned problems, which is a recording medium stored a communication program, said program causing a computer to execute the processes of: deciding number of CoMP (coordinated multipoint transmission and reception) points to a user equipment by using information related to scheduling.

The 7th invention for solving the above-mentioned problems, which is a recording medium stored a communication program, said program causing a computer to execute the processes of: communicating to use decided number of CoMP (coordinated multipoint transmission and reception) points based on using information related to scheduling by a base station.

Advantageous Effect

Dynamic CoMP point decision and efficient resource allocation assume part of or all possible combinations of CoMP points to calculate and rank scheduling metric. The spectrum efficiency is improved by comparing the channel-dependent scheduling result using different calculated scheduling metrics. Comparing the proposed approach with conventional one, larger CoMP gain in terms of cell-edge user throughput and average sector throughput can be achieved.

BRIEF DESCRIPTION OF DRAWINGS

For a more complete understanding of the present disclosure and its advantages, reference is now made to the following description taken in conjunction with the accompanying drawings, in which like reference numerals represent like parts.

REFERENCE SIGNS LIST

Figure 1:
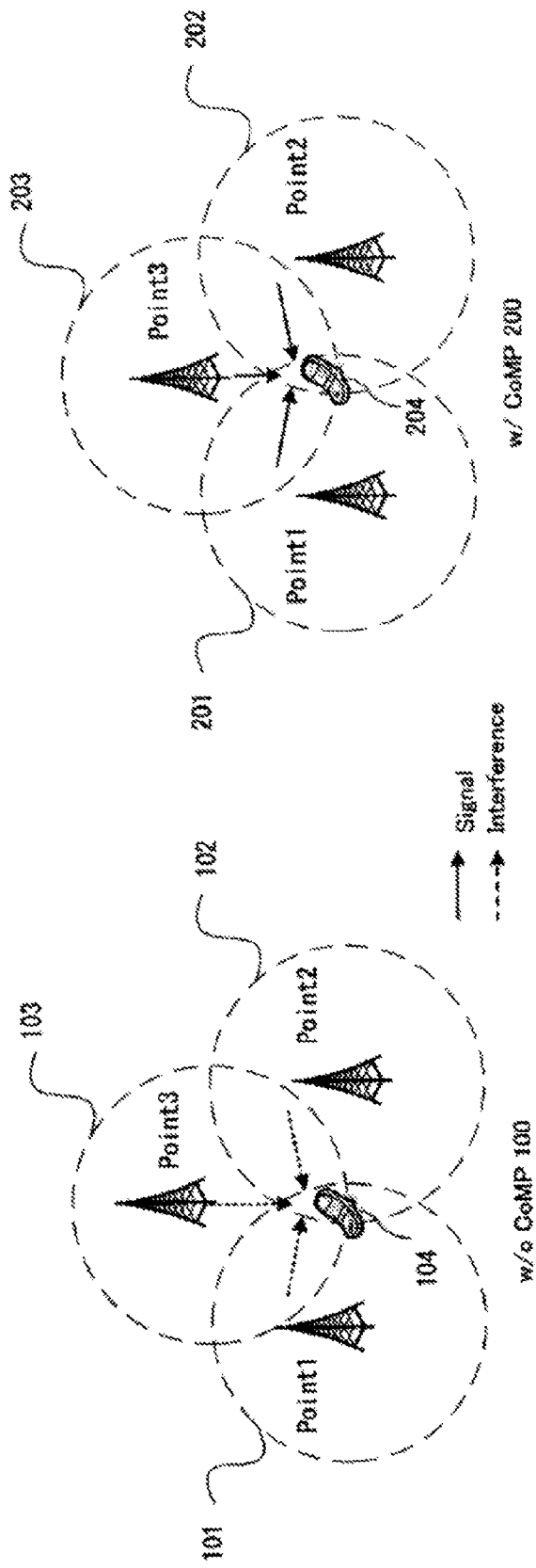
FIG. 1 shows an example of DL transmission without CoMP and with CoMP.
Figure 2:
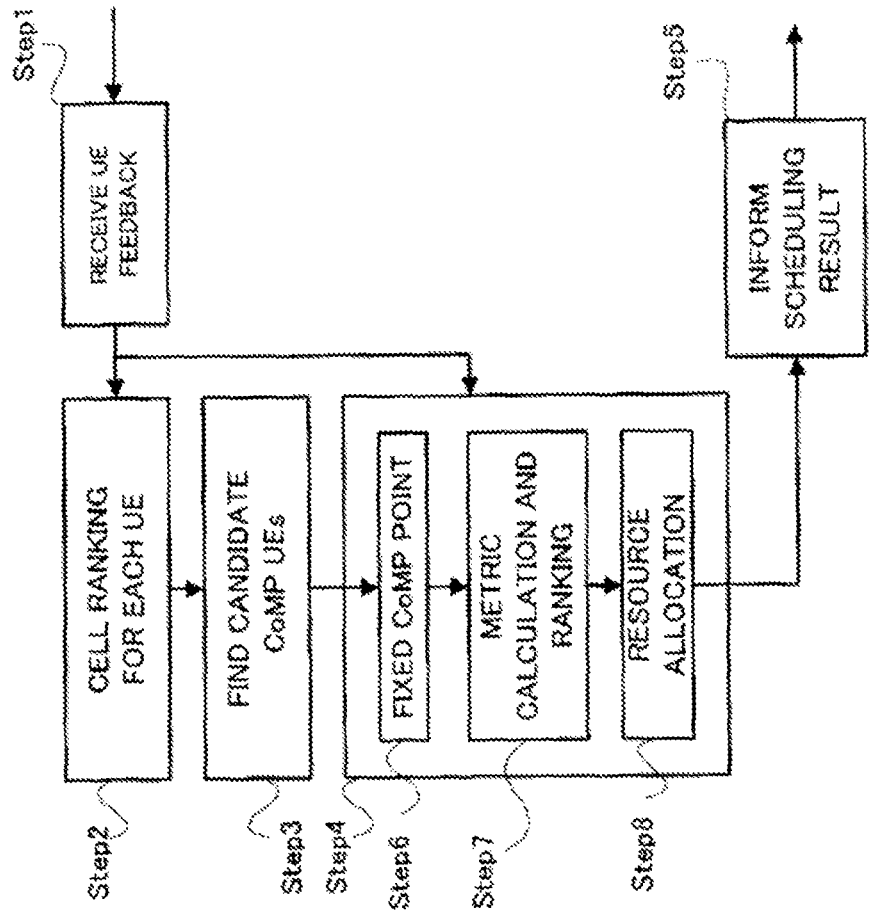
FIG. 2 shows a flowchart of conventional method.

310 UE (user equipment)
311 reference signal transmitter
312 data transmitter
313 controller
314 antenna
315 receiver
320 eNodeB
321 reference signal receiver
322 data receiver, 323 controller
324 scheduler
325 transmitter
326 antenna

BEST MODE FOR CARRYING OUT THE INVENTION

FIG. 4 through 13, discussed below, and the embodiment used to describe the principles of the present invention are by way of illustration only and should not be construed in any way to limit the scope of the disclosure. Those skilled in the art will understand that the principles of the present disclosure may be implemented in any suitably arranged wireless network.

Figure 3:
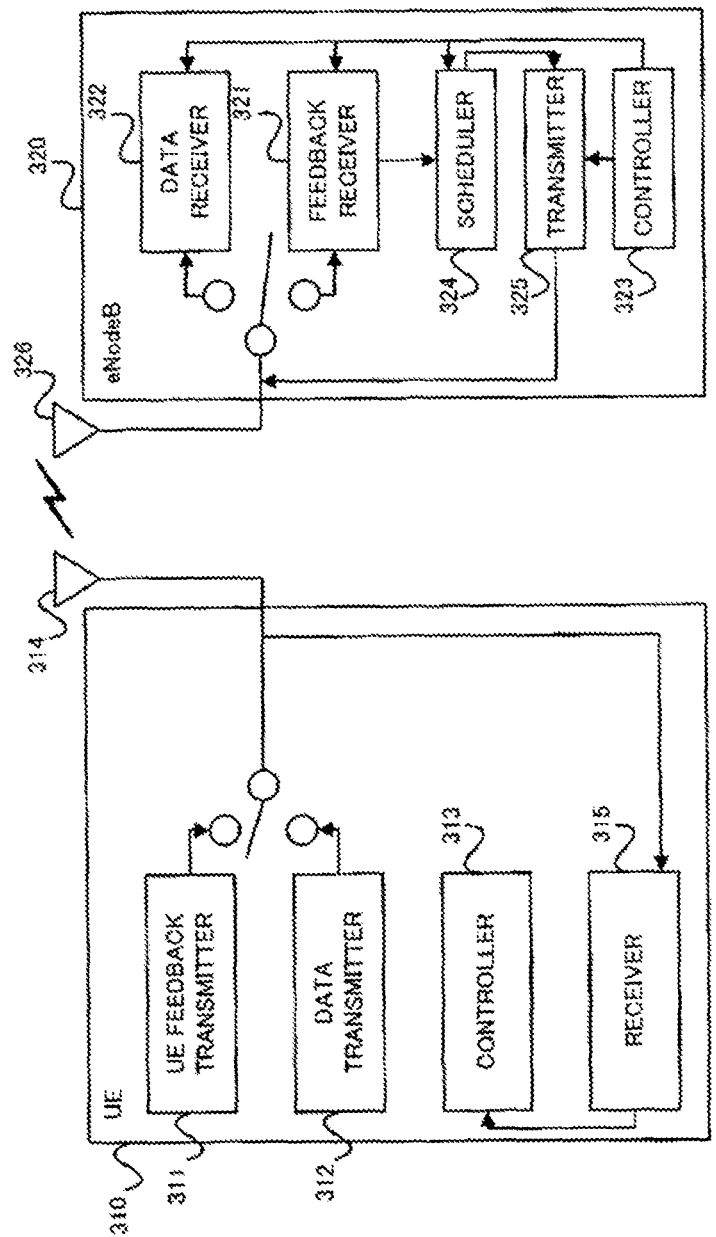
FIG. 3 shows one example of a block diagram of the present invention.

At first, a configuration of this embodiment will be explained. FIG. 3 is a schematic view of a wireless communication system 300 in the present invention. The wireless communication system 300 includes a plural of UE (User Equipment) 310 and a plural of eNodeB 320.

The UE 310 includes a UE feedback transmitter 311, a data transmitter 312, a controller 313, an antenna 314, and a receiver 315.

The UE feedback transmitter 311 generates a UE feedback, and transmits it to the each eNodeB 320 as serving cell via the antenna 314. The UE feedback includes the measurement long-term averaged channel information, such as RSRP for each of all eNodeB.

The data transmitter 312 generates an actual data, and transmits it to the eNodeB 320 via the antenna 314.

When receives pilot signal from eNodeB, the controller 313 measures RSRP (reference signal received power), geometry, or CQI (channel quality index) as UE feedback of the eNodeB.

The receiver 315 receives various kinds of the data or control information being transmitted from the eNodeB 320.

The eNodeB 320 is a point, for example, a base station. The eNodeB 320 includes a feedback receiver 321, a data receiver 322, a controller 323, a scheduler 324, a transmitter 325 and an antenna 326.

The feedback receiver 321 receives the feedback information generated by the UE. The UE feedback may be exchanged between eNodeBs for coordinated transmission or reception. The data receiver 322 receives an actual data generated by the UE. The controller 323 carries out several kind of controlling for each function in eNodeB, for example, controlling of transmit power etc. The scheduler 324 carries out resource allocation, and generates scheduling information based on resource allocation. Furthermore, carries out coordination of transmission or reception for CoMP UE, its details are as follows. The transmitter 325 transmits the scheduling information via the antenna 326.

Next, a proposed method of this invention will be explained.

Figure 4:
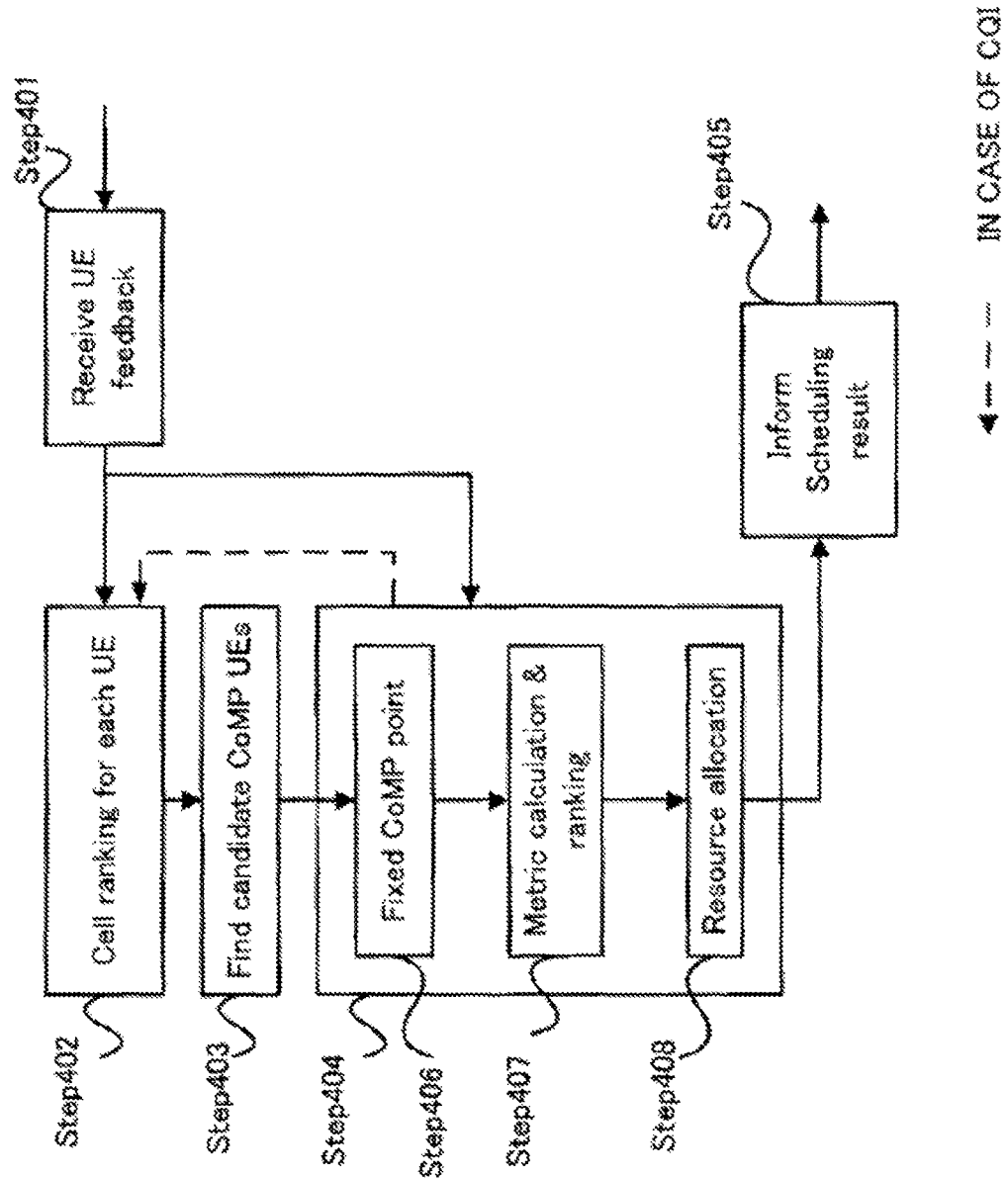
FIG. 4 shows a General flowchart of proposed method.

Firstly, a general flowchart of the method is illustrated in FIG. 4, which is described as follows.

In Step 401, a scheduler 324 receives UE feedback information about all the points (e.g., cells) close to the UE.

In Step 402, the cell (or other types of points) ranking is carried out for each UE. For each UE, the cells are ranked as follows.

$$X_{m,\delta} \geq X_{m,1} \geq X_{m,2} \ldots$$

where
$X_{m,\delta}$ is the uth UE feedback information of the δth cell in dB (u and δ are natural number).

When $$X_{m,\delta}$$

is the UE feedback RSRP or geometry, the UE feedback RSRP or geometry is obtained from Step 401.

When $$X_{m,\delta}$$

is the CQI information of the allocated RBs, the positions of allocated RBs is obtained from Step 404 (explained later).

In Step 403, the candidate CoMP point is selected for each UE and the UE who has more than one candidate CoMP points is regarded as a candidate CoMP UE. For the uth UE, the point with highest is selected as the serving cell, which is always a CoMP point. The cell with its $$X_{m,\delta} \geq X_{m,0} - \text{Threshold}$$

is also selected as the candidate CoMP point, where Threshold is pre-defined parameter in dB.

In Step 404, the CoMP points of candidate CoMP UEs are not fixed for metric ranking. Firstly, the number of CoMP points is initialized for the scheduling metric calculation and ranking. Next, for a CoMP candidate UE, the CoMP point decision and resource allocation are jointly carried out. Accordingly, the decided CoMP points and allocation results are used to update metric ranking for the following resource allocation. The step 406 includes the initialization of the CoMP point(s) and the metric ranking. The scheduling metric is ranked by using initialized N CoMP points at the beginning and then update by using the decided CoMP points and scheduling results from the output of step 407. In the step 407, the CoMP point decision as well as resource allocation is carried out for each UE. The result of step 407 will be used to update metric ranking in step 406.

In Step 405, the scheduler informs the scheduling result to the UEs, e.g., the positions and number of allocated RBs.

Next, the following discussion gives Example 1~9 to illustrate proposed method. The flowcharts of 9 examples are based on general flowchart in FIG. 4 but have different Step 404. The flowchart of Step 406 and Step 407 in the Step 404 will be explained for Example 1~9 in FIG. 5~13, respectively. Concerning decision number of CoMP point "$N_0$", example 1~9 carry out to use information related to scheduling. The information related to scheduling is information that is used by scheduling, for example PF metric, CQI or Qos etc. To be noted is that we calculate scheduling metric according to PF metric as an example. The scheduling metric can be based on maximum CQI criterion, quality of service (QoS) etc. It is preferable for information related to scheduling calculated in the case of scheduling in the eNodeB. In addition, concerning allocation, example 1~9 carry out to consider the information related to scheduling in assuming par or all CoMP point.

In the following Example 1~3, the Step 404 in FIG. 4 is carried out to allocate resource blocks at first and then decide CoMP points. The best combination of CoMP points is selected to achieve the highest normalized sum rate of allocated RBs. Since different initialization is assumed in step 406, the corresponding process in step 407 is also different for each Example.

In Example 4~6, the Step 404 in FIG. 4 is carried out to decide CoMP points first and then allocate resource blocks. The best combination of Compo points is selected to achieve the highest spectrum efficiency normalized rate based on the RB with highest metric belong to the candidate CoMP UE. After that, the resource is allocated to this UE by using decided number of CoMP points.

In Example 7~9, the Step 404 in FIG. 4 is carried out to recursively decide CoMP points and allocate resource blocks. The scheduler 324 firstly allocates a RB with highest metric and temporarily decides the number of CoMP points N based on this allocated RB. Then, the scheduler 324 tries to allocate one more RB and adjust $N_0$ to achieve highest normalized sum rate of allocated RBs. The RBs is allocated one-by-one for a candidate CoMP UE by using the lasted updated $N_0$. This iteration process stops until all the RBs with highest metric belong to this UE is allocated and the number of CoMP points is also decided.

Additionally, while a configuration in which the scheduler ranked the cells UE by UE was exemplified in the above-mentioned explanation, a configuration in which the cells are ranked in the UE side and transmitted to the eNode B may be employed.

Example 1

The example 1 is explained below. The scheduler 324 in the example 1 will be explained.

The scheduler 324 calculates the metric of each resource block (RB) of all UEs. For a non-CoMP UE, e.g., a UE close to cell center, only single point transmission is used, i.e., N=1. For a candidate CoMP UE, e.g., a UE close to cell edge, the metrics are calculated by using the CQI assuming all combinations of the CoMP points. Here, the combination of the CoMP points means to select different number of CoMP points. The number of the CoMP points, N, is a numerical value ranging from "1 to $N_{max}$", where the maximum value $N_{max}$ of the CoMP point may be pre-decided.

The scheduler 324 ranks the calculated metrics RB by RB. Among the calculated metrics, the scheduler 324 finds the highest metric and regards its owner UE as the watched UE, also called the highest UE. In addition, the scheduler 324 allocates the RBs to the watched UE when its metric is highest.

When the watched UE is a candidate CoMP UE, the scheduler 324 firstly divides the allocated RBs of this watched UE into different groups, each group has the metric assuming same number of CoMP points. Next, the scheduler 324 calculates the normalized sum rate of the allocated RBs belong to each group. The normalized sum rate of a group assuming N CoMP points, T(N), is defined as the sum of estimated data rates normalized by f(N) when the RB(s) are simultaneously allocated on N CoMP points. Here, f(N) is a function of N, e.g., $f(N) = \max(1, \alpha N)$ and $0 < \alpha < 1$ is the adjusting factor.

According to the comparison of normalized sum rate of assuming different number of CoMP points, the scheduler 324 finally decides the number of CoMP points "$N_0$" for this watched UE based the highest normalized sum rate. Then, CoMP points are decided too, since above process have already assumed combination of CoMP point. The decided number of CoMP points is "$N_0$" below.

After CoMP point decision, the scheduler 324 releases the allocated RBs with metric of N unequal to $N_0$ of watched UE. In addition, the metric ranking is updated by deleting the metrics with N unequal to $N_0$ of the watched UE The scheduler 324 performs the above mentioned process until all the RBs are allocated or all UEs are allocated, where the candidate CoMP UEs have also decided their CoMP point(s).

The above-mentioned process is carried out cell-by-cell. After all cells have finished the above mentioned process, the scheduler 324 coordinates the resource allocation for the CoMP UEs. When a CoMP UE is allocated different RB(s) from its CoMP points, the scheduler 324 coordinates different owner UEs on this uncommonly allocated RB. One coordination method is to release the uncommonly allocated RB to another UE, who can be the UE with lower metric than the allocated UE in the metric ranking list of this RB. When a CoMP UE is not allocated the RB of CoMP points as a result of coordination, the scheduler will allocate the CoMP UE in the next scheduling time.

Figure 5:
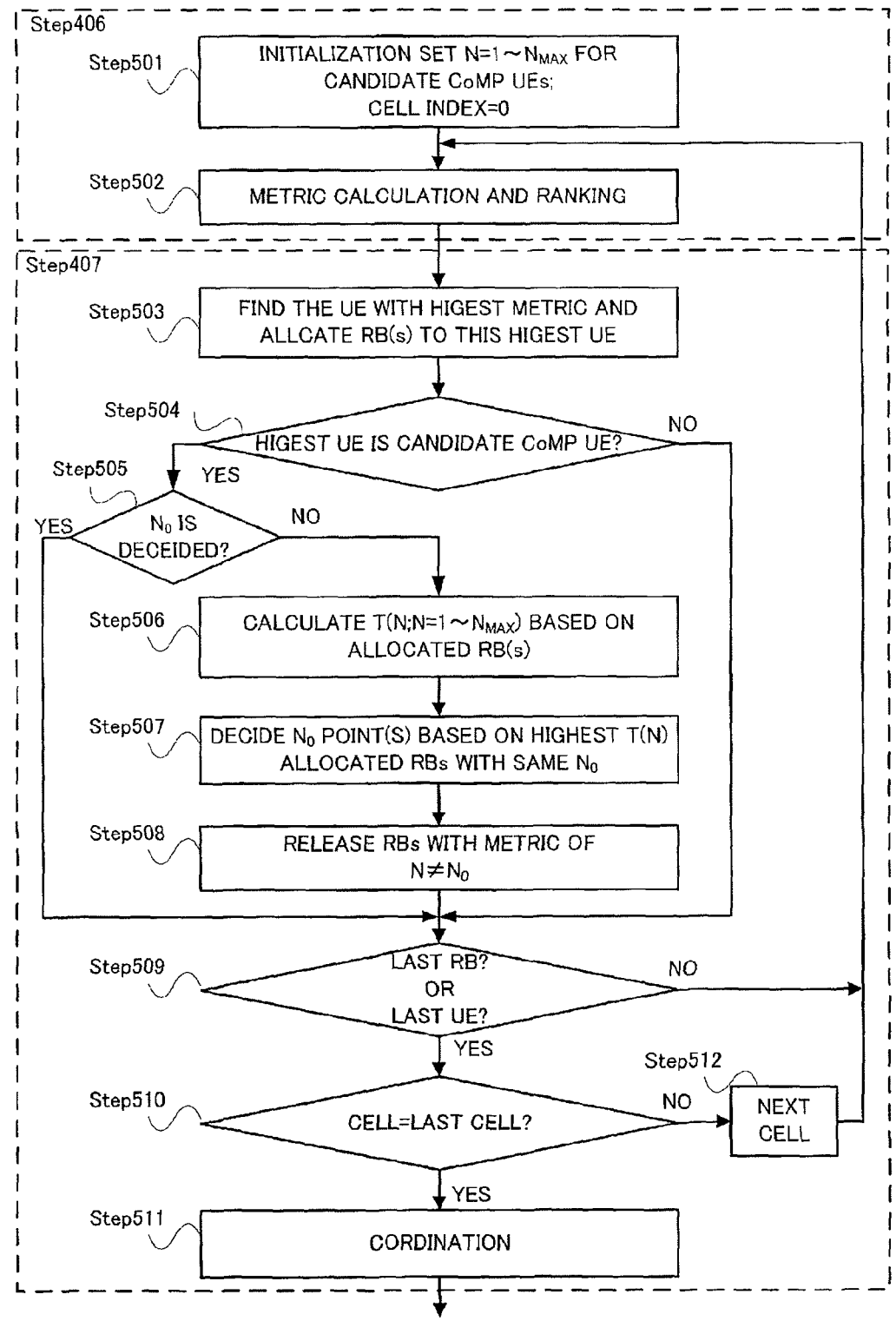
FIG. 5 shows a flowchart of Example 1.

An operation of this example is described below. For Example 1, the detailed flowchart of step 406 and step 407 in the Step 404 is shown in FIG. 5 and described as follows. In step 406 of FIG. 5, there are two steps, step 501 and 502. In step 407 of FIG. 5, there are ten steps, step 503 to 512.

In step 501, the number of CoMP points of candidate CoMP UEs is initialized as N=1~$N_{max}$; while for other UEs, N=1. Here, the cell index starts from 0. The start cell index is optional.

Next, in step 502, the metric calculation and ranking use CQI of different UEs with initialized N CoMP points for channel-dependent scheduling. Here, the PF metric is explained as an example as $$PF\#N = \{PF^{\#N}(u, k)\} \quad \text{(Math 1)}$$

$$\text{where } PF^{\#N}(u, k) = \frac{1}{f(N)} \frac{\text{Rate}^{\#N}(u, k)}{\overline{\text{Rate}(u)}}$$

and $$\begin{cases} u: UE \text{ index} \\ k: RB \text{ index} \\ N: \text{number of } CoMP \text{ points} \\ f(N) = \max\{1, \alpha N\}: \text{rate normalization fuction} \\ \overline{\text{Rate}(u)}: \text{average rate of the } u\text{th } UE \\ \text{Rate}^{\#N}(u, k): \text{Estimated rate of the } u\text{th } UE \text{ on the } k\text{th } RB \\ \qquad \text{by using combined } CQI \text{ with } N \text{ } CoMP \text{points} \end{cases}$$

In step 503, the scheduler firstly finds the UE with highest metric, which is regarded as the highest UE. According to the metric ranking on each unallocated RBs, the scheduler can allocate the RB to the highest UE when the top metric is belong to this UE.

In step 504, the scheduler checks whether the highest UE is a candidate CoMP UE or not. If yes, go to step 505; otherwise, go to step 509.

In step 505, the scheduler checks whether this candidate CoMP UE has already decided $N_0$ (N: number of CoMP points) or not. If yes, go to step 509; otherwise, go to step 506.

In step 506, the scheduler calculates T(N) for each N=1~$N_{max}$. Since the metric for the current candidate CoMP UE is calculated by assuming N=1~$N_{max}$, the allocated RBs may include the RBs with the metric of various N.

In step 507, the scheduler decides N=$N_0$ when $N_0$ CoMP points can achieve the highest T($N_0$). Then, CoMP points are decided too.

In step 508, knowing the decided $N_0$, the scheduler releases the RBs, allocated to the UE but assuming N unequal to $N_0$.

In the step 509, scheduler checks whether all RBs or UEs are allocated. If yes, go to step 510; otherwise, go to step 502 in step 406 to update the metric ranking.

After the resource allocation and point decision have been completed in the current cell, the step 510 of the scheduler checks whether the current cell is the last cell. If yes, go to step

511; otherwise, go to step 512 to move to the next cell and then go to step 502 in step 406 to calculate and rank the metrics of the UEs belong to the cell.

In step 511, the scheduler coordinates after resource allocation for each cell. For each CoMP UE, if the allocated RB is not commonly allocated at each CoMP point, the scheduler will replace the owner of this RB by the next UE with lower PF metric. The output of step 511 is the information about allocated RBs for each UE.

Making a configuration like this example enables to improve both average cell throughput and cell-edge user throughput.

Example 2

The example 2 will be explained. The explanation of a configuration similar to that of the above-mentioned example is omitted.

The scheduler 324 calculates the metric of each RB by assuming that the number of CoMP points is simply initialized as single point, i.e., N=1 for candidate CoMP UEs as well as for other non-CoMP UEs.

The scheduler 324 calculates the metrics of all UEs on each RB and ranks the calculated metrics RB by RB.

Among the calculated metrics, the scheduler 324 finds the highest metric and regards its owner UE as the watched UE, also called the highest UE. According to the metric ranking on each unallocated RBs, the scheduler can allocate the RB to the highest UE when the top metric is belong to this UE.

When the watched UE is a candidate CoMP UE, the scheduler 324 calculates T(N=1) of highest RB based on the CQI assuming N=1 CoMP point. Further, the scheduler 324 calculates T(N+1) by using combined CQI when N+1 CoMP points are used for synchronous transmission on the allocated RBs of the watched UE.

The scheduler 324 compares the calculated T(N=1) and T(N+1). If T(N+1)>T(N), the scheduler increases N as N=N+1. This iteration process will stop only if the maximum T($N_0$) is achieved. Therefore, the number of the CoMP points is decided as N=$N_0$. Then, CoMP points are decided too, since above process have already assumed combination of CoMP point.

After CoMP point decision, the scheduler 324 updates the metric ranking when $N_0$ is unequal to the initialized N (N=1 in this example). Firstly, the metrics of the watched UE with initialized N is deleted and then replaced by the metric as N=$N_0$. The metric ranking is updated by using the new metric with N=$N_0$ of the watched UE.

The scheduler 324 performs the above-mentioned process until all the RBs are allocated or all UEs are allocated, where the candidate CoMP UEs have also decided their CoMP point(s).

The above-mentioned process is carried out cell-by-cell. After all cells have finished the above mentioned process, the scheduler 324 coordinates the resource allocation for the CoMP UEs. When a CoMP UE is allocated different RB(s) from its CoMP points, the scheduler 324 makes coordination for this uncommonly allocated RB. One coordination method is to release the uncommonly allocated RB to another UE, who can be the UE with lower metric than the allocated UE in the metric ranking list of this RB. When a CoMP UE is not allocated the RB of CoMP points as a result of coordination, the scheduler will allocate the CoMP UE in the next scheduling time.

An operation of this example is described below. For Example 2, the detailed flowchart of step 406 and step 407 in the Step 404 is shown in FIG. 6 and described as follows.

Figure 6:
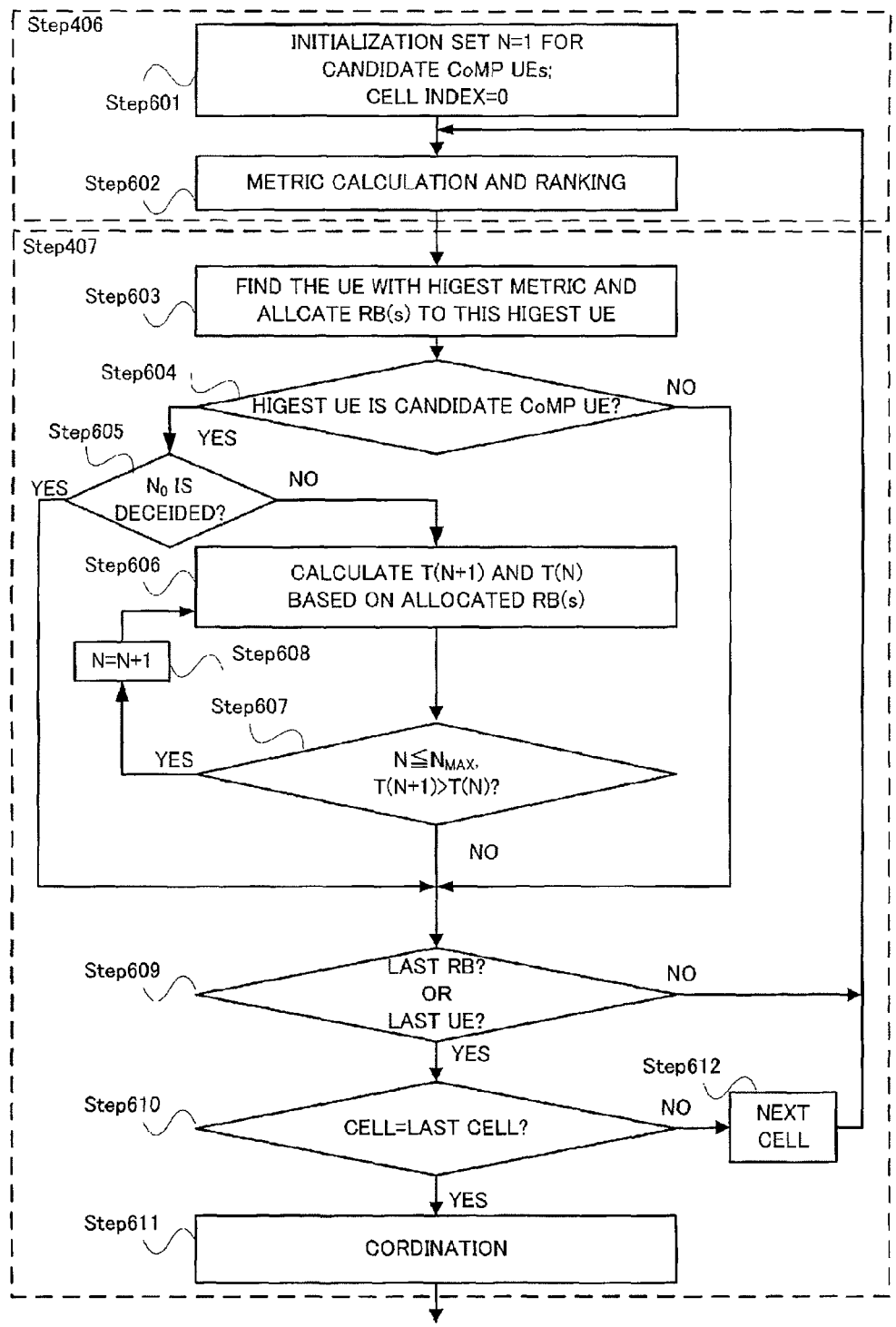
FIG. 6 shows a flowchart of Example 2.

In step 406 of FIG. 6, there are two steps, step 601 and 602. In step 601, the number of CoMP points is initialized as N=1 and the cell index starts from 0. Next, in step 602, the metric calculation and ranking use CQI assuming initialized N=1 CoMP point for CoMP UE candidates as well as for other non-CoMP UE to carry out channel-dependent scheduling. Here, the PF metric is explained in Math. 1.

In step 407 of FIG. 6, the step 603 firstly allocates each unallocated RB to the UE with highest metric. Among the allocated RBs, the scheduler 324 finds the RB with highest metric and regards its owner UE as the watched UE, also called the highest UE. Then, the step 604 checks whether the highest UE (the UE with highest PF metric) is a candidate CoMP UE or not. If yes, go to step 605; otherwise, go to step 609. The step 605 checks whether this candidate CoMP UE has already decided N or not.

If yes, go to step 609; otherwise, go to step 606. In step 606, the achievable T(N) of this candidate CoMP UE is calculated based on CQI of the allocated RB(s). T(N) and T(N+1) are calculated by assuming N and N+1 CoMP points, respectively. Next, the step 607 compares T(N) and T(N+1) and checks whether N<$N_{MAX}$ and T(N+1)>T(N) or not.

If yes, go to step 608, where N is increased as N=N+1; otherwise, go to step 609. Accordingly, the number of CoMP points is decided as N=$N_0$ to achieve highest T($N_0$). Then, CoMP points are decided too. After the CoMP point decision, the step 609 checks whether all RBs or UEs are allocated.

If yes, go to step 610; otherwise, go to step 602 in step 406 to update the metric ranking. The step 610 checks whether the current cell is the last cell. If yes, go to step 611; otherwise, go to step 612 to move to the next UE and then go to step 602 in step 606 to update the metric ranking. In step 611, the coordination after resource allocation for each cell is carried out. For each CoMP UE, if the allocated RB is not commonly allocated at each CoMP point, the scheduler will replace the owner of this RB by the next UE with lower metric. The output of step 611 is the information about allocated RBs for each UE.

Making a configuration like this example enables to improve both average sector throughput and cell-edge user throughput.

Example 3

The scheduler 324 in the example 3 will be explained. The explanation of a configuration similar to that of the above-mentioned example is omitted.

The scheduler 324 calculates the metric of each RB of the UE by assuming that the number of CoMP points is simply initialized as single point, i.e., N=$N_{max}$ ($N_{max}$: maximum number of CoMP points) for candidate CoMP UEs but N=1 for other non-CoMP UE.

The scheduler 324 calculates the metrics of all UEs on each RB and ranks the calculated metrics RB by RB. Among the allocated RBs, the scheduler 324 finds the RB with highest metric and regards its owner UE as the watched UE, also called the highest UE. According to the metric ranking on each unallocated RBs, the scheduler can allocate the RB to the highest UE when the top metric is belong to this UE.

Over the allocated RBs, the scheduler 324 calculates T(N=$N_{max}$) of the watched UEs based on the CQI assuming $N_{max}$ CoMP point. Further, the scheduler 324 calculates T(N−1) by using combined CQI when N−1 CoMP points are used for synchronous transmission on the allocated RBs of the watched UE.

The scheduler 324 compares the calculated T(N) and T(N−1). If N>1 and T(N)<T(N−1), the scheduler updates N=N−1.

This process will stop only if the maximum $T(N_0)$ is achieved. Therefore, N is decided as $N_0$. Then, CoMP points are decided too, since above process have already assumed combination of CoMP point.

After CoMP point decision, the scheduler 324 updates the metric ranking when $N_0$ is unequal to the initialized N ($N=N_{max}$ in this example). Firstly, the metrics of the watched UE with initialized N is deleted and then replaced by the metric as $N=N_0$. The metric ranking is updated by using the new metric with $N=N_0$ of the watched UE.

The scheduler 324 performs the above-mentioned process until all the RBs are allocated or all UEs are allocated, where the candidate CoMP UEs have also decided their CoMP point(s).

The above-mentioned process is carried out cell-by-cell. After all cells have finished the above mentioned process, the scheduler 324 coordinates the resource allocation for the CoMP UEs. When a CoMP UE is allocated different RB(s) from its CoMP points, the scheduler 324 makes coordination for this uncommonly allocated RB. One coordination method is to release the uncommonly allocated RB to another UE, who can be the UE with lower metric than the allocated UE in the metric ranking list of this RB. When a CoMP UE is not allocated the RB of CoMP points as a result of coordination, the scheduler will allocate the CoMP UE in the next scheduling time.

An operation of this example is described below. For Example 3, the detailed flowchart of step 406 and step 407 in the Step 404 is shown in FIG. 7 and described as follows.

Figure 7:
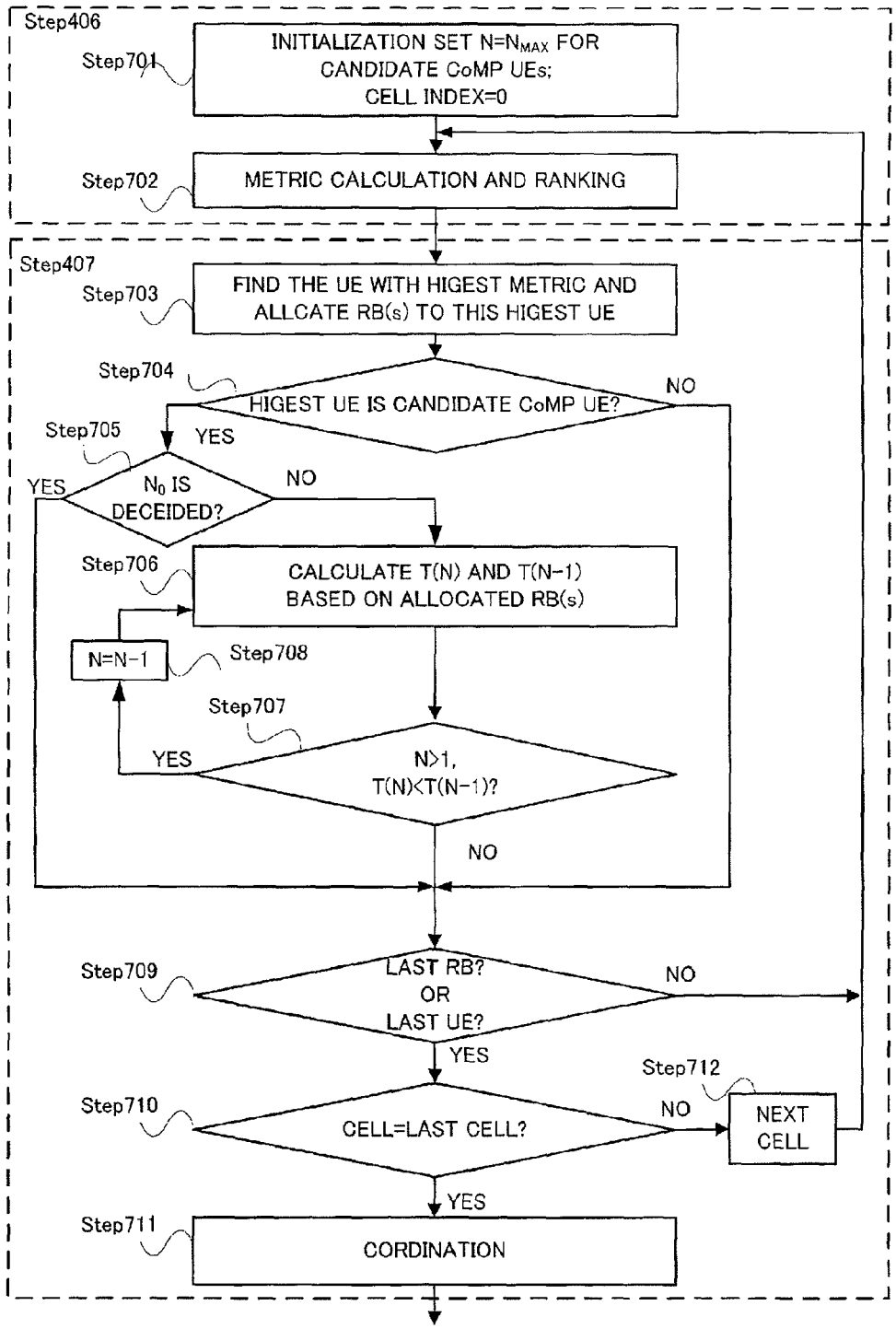
FIG. 7 shows a flowchart of Example 3.

In step 406 of FIG. 7, there are two steps, step 701 and 702. In step 701, the number of CoMP points is initialized as $N=N_{max}$ and the cell index starts from 0. Next, in step 702, the metric calculation and ranking use CQI assuming initialized $N=N_{max}$ CoMP points for CoMP UE candidates as well as for other non-CoMP UE to carry out channel-dependent scheduling. Here, the PF metric is explained in Math. 1.

In step 407 of FIG. 7, the step 703 firstly finds the RB with highest metric and regards its owner UE as the watched UE, also called the highest UE. According to the metric ranking on each unallocated RBs, the scheduler can allocate the RB to the highest UE when the top metric is belong to this UE.

Then, the step 904 checks whether the highest UE (the UE with highest PF metric) is a candidate CoMP UE or not. If yes, go to step 705; otherwise, go to step 709. The step 705 checks whether this candidate CoMP UE has already decided $N_0$ or not.

If yes, go to step 709; otherwise, go to step 706. In step 706, the achievable normalized sum rate of this candidate CoMP UE is calculated based on the CQI of allocated RB(s). T(N) and T(N−1) are calculated by assuming N and N−1 CoMP points, respectively. Next, the step 707 compares T(N) and T(N+1) and checks whether N>1 and T(N)<T(N−1) or not.

If yes, go to step 708, where N is decreased as N=N−1; otherwise, go to step 709. Accordingly, the number of CoMP points is decided as $N=N_0$ to achieve highest normalized sum rate. After the CoMP point decision, the step 709 checks whether all RBs or UEs are allocated.

If yes, go to step 710; otherwise, go to step 702 in step 406 to update the metric ranking. The step 710 checks whether the current cell is the last cell. If yes, go to step 711; otherwise, go to step 712 to move to the next UE and then go to step 702 in step 706 to update the metric ranking. In step 711, the coordination after resource allocation for each cell is carried out. For each CoMP UE, if the allocated RB is commonly allocated at each CoMP point, replace the owner of this RB by the next UE with lower metric. The output of step 711 is the information about allocated RBs for each UE.

Making a configuration like this example enables to improve both average sector throughput and cell-edge user throughput.

Example 4

The scheduler 324 in the example 4 will be explained. The explanation of a configuration similar to that of the above-mentioned example is omitted.

The scheduler 324 calculates the metric of each of the resource blocks (RBs) of all UEs. For a candidate CoMP UE, the metrics are calculated by using the CQI assuming all combinations of the CoMP points.

The scheduler 324 ranks the calculated metrics RB by RB.

Among the calculated metrics, the scheduler 324 finds the RB with the highest metric and regards its owner UE as the watched UE, also called the highest UE.

When the watched UE is a candidate CoMP UE, the scheduler 324 decides the number of CoMP points "$N_0$" for this watched UE based on the RB with the highest metric. Then, CoMP points are decided too, since above process have already assumed combination of CoMP point.

After CoMP point decision, the scheduler 324 deletes the metric with N unequal to $N_0$ and updates the metric ranking by using the metric of $N=N_0$. In addition, the scheduler 324 allocates the RBs to the watched UE when the top metric belongs to this UE.

The scheduler 324 performs the above mentioned process until all the RBs are allocated or all UEs are allocated, where the candidate CoMP UEs have also decided their CoMP point(s).

The above-mentioned process is carried out cell-by-cell. After all cells have finished the above mentioned process, the scheduler 324 coordinates the resource allocation for the CoMP UEs. When a CoMP UE is allocated different RB(s) from its CoMP points, the scheduler 324 coordinates different owner UEs on this uncommonly allocated RB. One coordination method is to release the uncommonly allocated RB to another UE, who can be the UE with lower metric than the allocated UE in the metric ranking list of this RB. When a CoMP UE is not allocated the RB of CoMP points as a result of coordination, the scheduler will allocate the CoMP UE in the next scheduling time.

Figure 8:
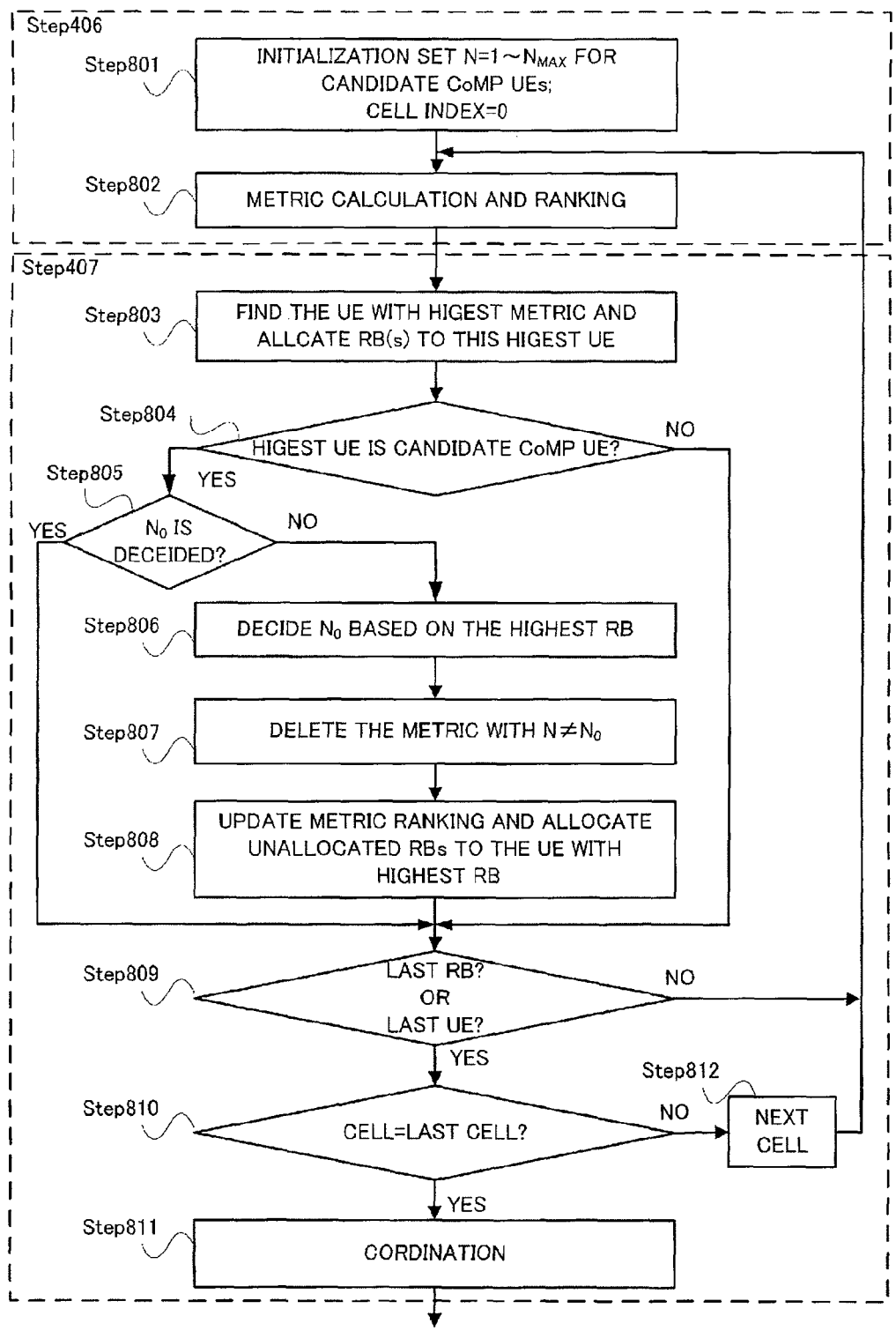
FIG. 8 shows a flowchart of Example 4.

An operation of this example is described below. For Example 4, the detailed flowchart of step 406 and 407 in the Step 404 is shown in FIG. 8 and described as follows. In step 406 of FIG. 8, there are two steps, step 801 and 802. In step 407 of FIG. 8, there are ten steps, step 803 to 812.

In step 801, the number of CoMP points of candidate CoMP UEs is initialized as $N=1\sim N_{max}$, while for other UEs, N=1. Here, the cell index starts from 0. The starts cell index is optional.

Next, in step 802, the metric calculation and ranking use CQI of different UEs with initialized N CoMP points for channel-dependent scheduling. Here, the PF metric is explained in Math. 1.

In step 803, the scheduler firstly finds the RB with the highest metric and regards its owner UE as the watched UE called the highest UE.

In step 804, the scheduler checks whether the highest UE is a candidate CoMP UE or not. If yes, go to step 805; otherwise, go to step 808.

In step 805, the scheduler checks whether this candidate CoMP UE has already decided $N_0$ or not. If yes, go to step 808; otherwise, go to step 806.

In step 806, the number $N_0$ of CoMP points is decided as $N=N_0$ since $N_0$ CoMP points can achieve the highest metric. Then, CoMP points are decided too.

After the CoMP point decision, in step 807, the scheduler deletes the UE's metric with N unequal to $N_0$ from the metric ranking list. If the highest metric of unallocated RB belongs to the current UE, this RB is allocated in the step 808.

In step 809, scheduler checks whether all RBs or UEs are allocated. If yes, go to step 810; otherwise, go to step 802 in block 406 to update the metric ranking.

After the resource allocation and point decision have been completed in the current cell, the step 810 of the scheduler checks whether the current cell is the last cell. If yes, go to step 811; otherwise, go to step 812 to move to the next cell and then go to step 802 in block 406 to calculate and rank the metrics of the UEs belong to the cell.

In step 811, the scheduler coordinates after resource allocation for each cell. For each CoMP UE, if the allocated RB is not commonly allocated at each CoMP point, the scheduler will replace the owner of this RB by the next UE with lower PF metric. The output of step 811 is the information about allocated RBs for each UE.

Making a configuration like this example enables to improve both average sector throughput and cell-edge user throughput.

Example 5

The scheduler 324 in the example 5 will be explained. The explanation of a configuration similar to that of the above-mentioned example is omitted.

The scheduler 324 calculates the metric of each RB by assuming that the number of CoMP points is simply initialized as single point, i.e., N=1 for candidate CoMP UEs as well as for other non-CoMP UEs.

Among the calculated metrics, the scheduler 324 finds the RB with highest metric and regards its owner UE as the watched UE, also called the highest UE.

When the watched UE is a candidate CoMP UE, the scheduler 324 firstly finds out the RB with the highest metric belong to this watched UE and calculates the T(N) based on the CQI assuming N=1 CoMP point. Further, the scheduler 324 calculates T(N+1) by using combined CQI when N+1 CoMP points are used for synchronous transmission on this RB.

The scheduler 324 compares the calculated T(N) and T(N+1). If the rate T(N+1)>T(N), the scheduler increases N as N=N+1. This iteration process will stop only if the maximum T(N) is achieved. Therefore, the number of the CoMP points is decided as $N=N_0$. Then, CoMP points are decided too, since above process have already assumed combination of CoMP point.

After CoMP point decision, the scheduler 324 releases the allocated RBs with metric of N unequal to $N_0$ of watched UE. In addition, the metric ranking is updated by deleting the metrics of the watched UE or calculating the metric as $N=N_0$. After updating the metric ranking, the scheduler 324 allocates the RBs to the watched UE of which the metric is highest.

The scheduler 324 performs the above-mentioned process until all the RBs are allocated or all UEs are allocated, where the candidate CoMP UEs have also decided their CoMP point(s).

The above-mentioned process is carried out cell-by-cell. After all cells have finished the above mentioned process, the scheduler 324 coordinates the resource allocation for the CoMP UEs. When a CoMP UE is allocated different RB(s) from its CoMP points, the scheduler 324 makes coordination for this uncommonly allocated RB. One coordination method is to release the uncommonly allocated RB to another UE, who can be the UE with lower metric than the allocated UE in the metric ranking list of this RB. When a CoMP UE is not allocated the RB of CoMP points as a result of coordination, the scheduler will allocate the CoMP UE in the next scheduling time.

Figure 9:
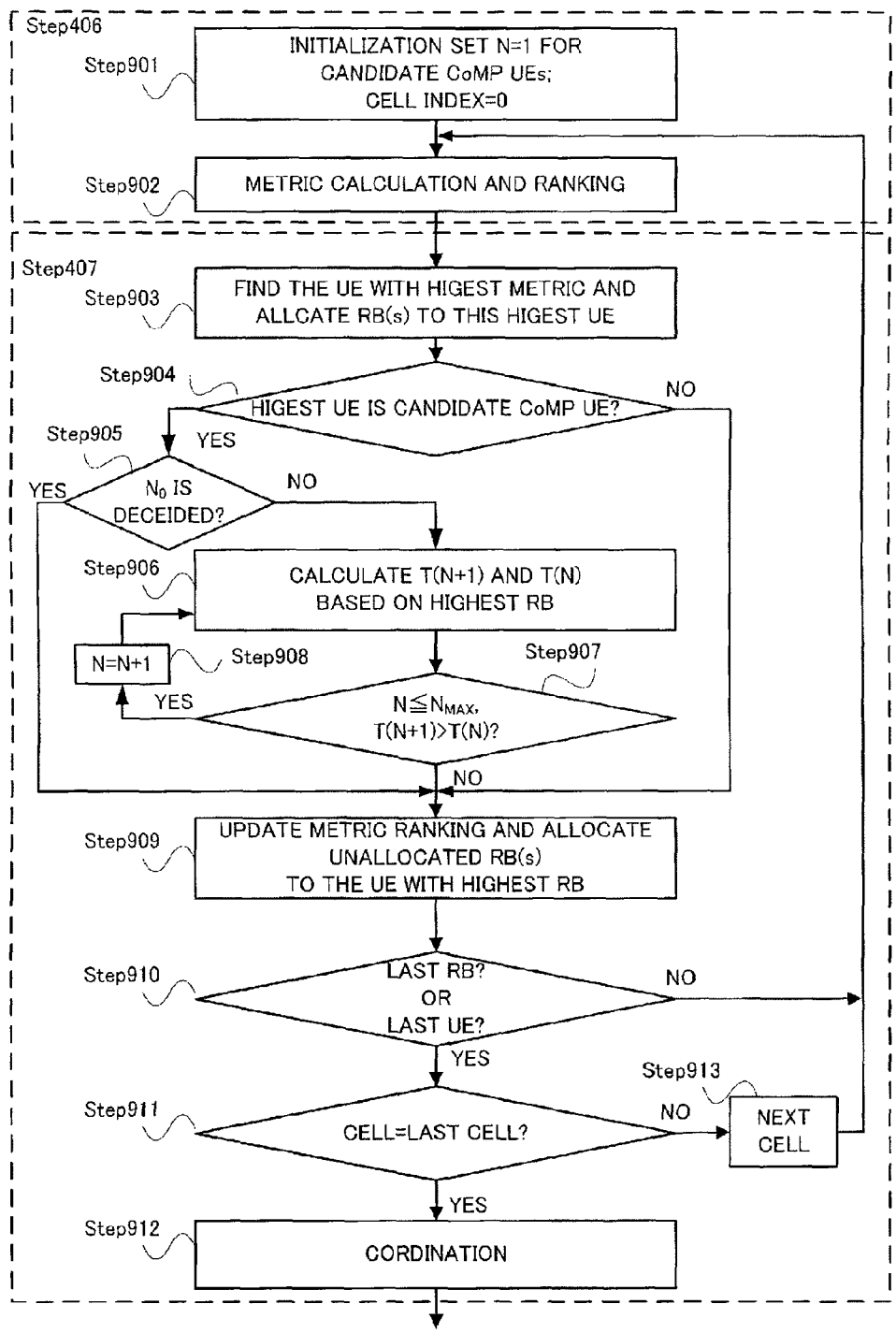
FIG. 9 shows a flowchart of Example 5.

An operation of this example is described below. For Example 5, the detailed flowchart of block 406 and 407 in the Step 404 is shown in FIG. 9 and described as follows. In block 406 of FIG. 9, there are two steps, step 901 and 902. In block 407 of FIG. 9, there are eleven steps, step 903 to 912.

In step 901, the number of CoMP points is initialized as N=1 and the cell index starts from 0. Next, in step 902, the metric calculation and ranking use CQI assuming initialized N=1 CoMP points for CoMP UE candidates as well as for other non-CoMP UE to carry out channel-dependent scheduling. Here, the PF metric is explained in Math. 1.

In block 407 of FIG. 9, the step 903 firstly finds the RB with highest metric. Among the allocated RBs, the scheduler 324 finds the RB with highest metric and regards its owner UE as the watched UE, also called the highest UE. Then, the step 904 checks whether the highest UE (the UE with highest PF metric) is a candidate CoMP UE or not. If yes, go to step 905; otherwise, go to step 909. The step 905 checks whether this candidate CoMP UE has already decided $N_0$ or not. If yes, go to step 909; otherwise, go to step 906. In step 906, the achievable normalized sum rate of this candidate CoMP UE is calculated based on the allocated RB(s). T(N) and T(N+1) are calculated by assuming N and N+1 CoMP points, respectively. Next, the step 907 compares T(N) and T(N+1) and checks whether $N<N_{max}$ and T(N+1)>T(N) or not.

If yes, go to step 908, where N is increased as N=N+1; otherwise, go to step 909. Accordingly, the number of CoMP points is decided as $N=N_0$ to achieve highest metric. If the highest metric of unallocated RB is the metric of the current UE with $N_0$ CoMP points, this RB is allocated in the step 909.

After the allocation, the step 910 checks whether all RBs or UEs are allocated. If yes, go to step 911; otherwise, go to step 902 in block 406 to update the metric ranking.

After the resource allocation and point decision have been completed in the current cell, the step 911 checks whether the current cell is the last cell. If yes, go to step 912; otherwise, go to step 913 to move to the next cell and then go to step 902 in block 406 to calculate and rank the metrics of the UEs belong to the cell.

In step 912, the scheduler coordinates after resource allocation for each cell. For each CoMP UE, if the allocated RB is not commonly allocated at each CoMP point, the scheduler will replace the owner of this RB by the next UE with lower PF metric. The output of step 912 is the information about allocated RBs for each UE.

Making a configuration like this example enables to improve both average sector throughput and cell-edge user throughput.

Example 6

The scheduler 324 in the example 6 will be explained. The explanation of a configuration similar to that of the above-mentioned example is omitted.

The scheduler 324 calculates the metric of each RB by assuming that the number of CoMP points is simply initialized as single point, i.e., $N=N_{max}$ for candidate CoMP UEs but N=1 for other non-CoMP UE.

The scheduler 324 ranks the calculated metrics RB by RB. Among the calculated metrics, the scheduler 324 finds the RB with highest metric and regards its owner UE as the watched UE, also called the highest UE.

When the watched UE is a candidate CoMP UE, the scheduler 324 firstly finds the RB with highest metric belong to this watched UE. The scheduler 324 calculates $T(N=N_{max})$ of the watched UEs based on the CQI assuming $N_{max}$ CoMP point. Further, the scheduler 324 calculates a sum rate T(N−1) by using combined CQI when N−1 CoMP points are used for synchronous transmission on the allocated RBs of the watched UE.

The scheduler 324 compares the calculated T(N) and T(N−1). If N>1 and T(N)<T(N−1), the scheduler updates N=N−1. This process will stop only if the maximum $T(N_0)$ is achieved. Therefore, N is decided as $N_0$. Then, CoMP points are decided too, since above process have already assumed combination of CoMP point.

After CoMP point decision, the scheduler 324 releases the allocated RBs with metric of N unequal to $N_0$ of watched UE. In addition, the metric ranking is updated by deleting the metrics of the watched UE or calculating the metric as $N=N_0$. In addition, the scheduler 324 allocates the RBs to the watched UE of which the metric is highest.

The scheduler 324 performs the above-mentioned process until all the RBs are allocated or all UEs are allocated, where the candidate CoMP UEs have also decided their CoMP point(s).

The above-mentioned process is carried out cell-by-cell. After all cells have finished the above mentioned process, the scheduler 324 coordinates the resource allocation for the CoMP UEs. When a CoMP UE is allocated different RB(s) from its CoMP points, the scheduler 324 makes coordination for this uncommonly allocated RB. One coordination method is to release the uncommonly allocated RB to another UE, who can be the UE with lower metric than the allocated UE in the metric ranking list of this RB. When a CoMP UE is not allocated the RB of CoMP points as a result of coordination, the scheduler will allocate the CoMP UE in the next scheduling time.

Figure 10:
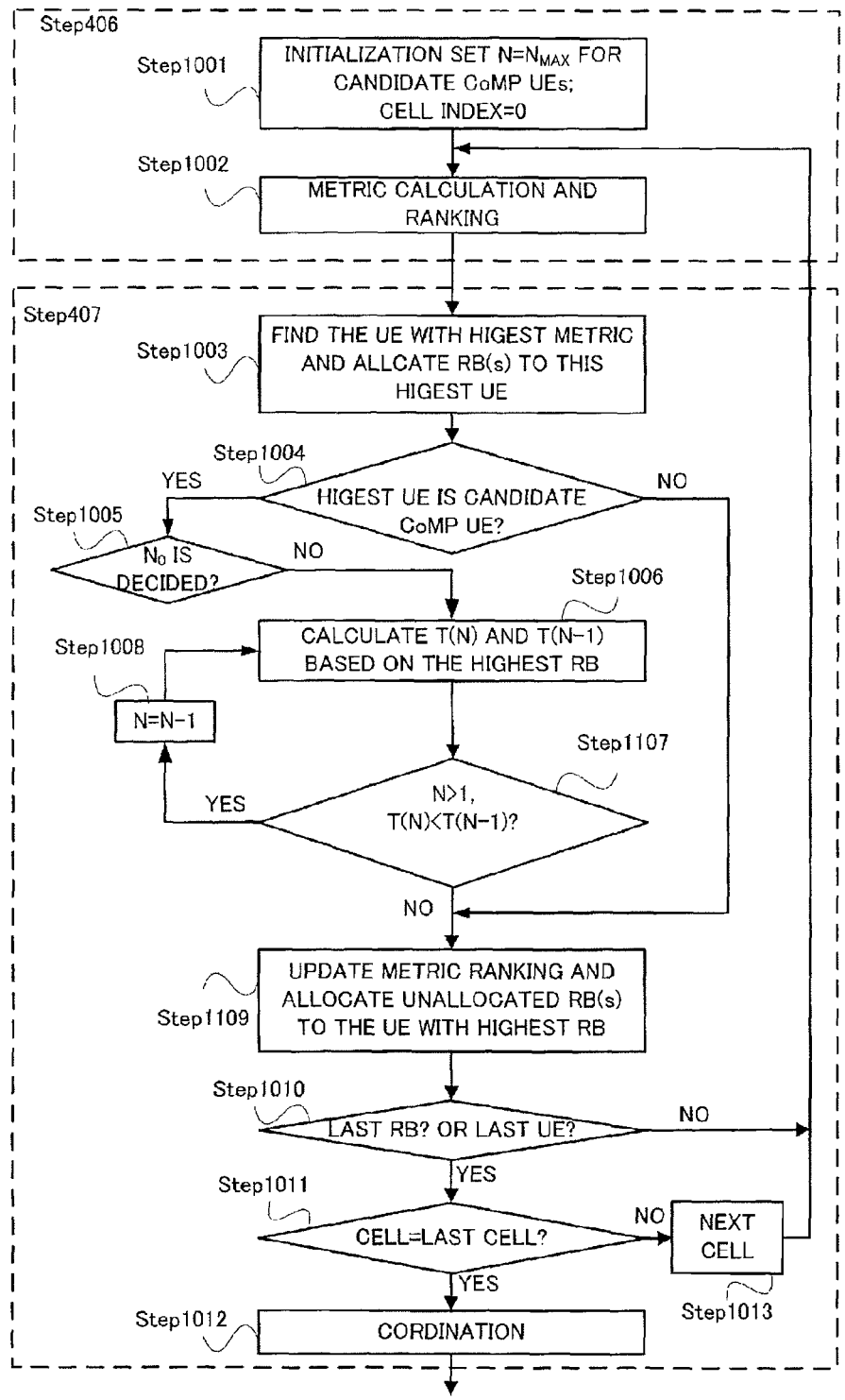
FIG. 10 shows a flowchart of Example 6.

An operation of this example is described below. For Example 6, the detailed flowchart of block 406 and 407 in the Step 404 is shown in FIG. 10 and described as follows. In block 406 of FIG. 10, there are two steps, step 1001 and 1002. In block 407 of FIG. 10, there are eleven steps, step 1003 to 1013.

In block 406 of FIG. 10, there are two steps, step 1001 and 1002. In step 1001, the number of CoMP points is initialized as $N=N_{max}$ and the cell index starts from 0. Next, in step 1002, the metric calculation and ranking use CQI assuming initialized $N=N_{max}$ CoMP points for CoMP UE candidates as well as for other non-Comp UE to carry out channel-dependent scheduling. Here, the PF metric is explained in Math. 1.

In block 407 of FIG. 10, the step 1003 firstly finds the RB with highest PF. Among the allocate RBs, the scheduler 324 finds the RB with highest metric and regards its owner UE as the watched UE, also called the highest UE. Then, the step 1004 checks whether the highest UE is a candidate CoMP UE or not.

If yes, go to step 1005; otherwise, go to step 1009. The step 1005 checks whether this candidate CoMP UE has already decided $N_0$ or not. If yes, go to step 1009; otherwise, go to step 1006. In step 1006, the achievable normalized sum rate of this candidate CoMP UE is calculated based on CQI of the allocated RB(s). T(N) and T(N−1) are calculated by assuming N and N−1 CoMP points, respectively. Next, the step 1007 compares T(N) and T(N+1) and checks whether N>1 and T(N)<T(N−1) or not.

If yes, go to step 1008, where N is decreased as N=N−1; otherwise, go to step 1009. Accordingly, the number of CoMP points is decided as $N=N_0$ to achieve highest metric. Then, CoMP points are decided too. If the highest metric of unallocated RB is the metric of the current UE with $N_0$ CoMP points, this RB is allocated in the step 1009.

After the allocation, the step 1010 checks whether all RBs or UEs are allocated. If yes, go to step 1011; otherwise, go to step 1002 in block 406 to update the metric ranking.

After the resource allocation and point decision have been completed in the current cell, the step 1011 checks whether the current cell is the last cell. If yes, go to step 1012; otherwise, go to step 1013 to move to the next cell. Then, step 1002 in block 406, scheduler calculates and ranks the metrics of the UEs belong to the cell.

In step 1012, the scheduler coordinates after resource allocation for each cell. For each CoMP UE, if the allocated RB is not commonly allocated at each CoMP point, the scheduler will replace the owner of this RB by the next UE with lower PF metric. The output of step 1012 is the information about allocated RBs for each UE.

Making a configuration like this example enables to improve both average sector throughput and cell-edge user throughput.

Example 7

The example 7 is explained below. The scheduler 324 in the example 7 will be explained. The explanation of a configuration similar to that of the above-mentioned example is omitted.

The scheduler 324 calculates the metric of each of the resource blocks (RBs) of all UEs. For a non-CoMP UE, e.g., a UE close to cell-center, only single point transmission is used, i.e., N=1. For a candidate CoMP UE, the metrics are calculated by using the CQI assuming all combinations of the CoMP points. Here, the combination of the CoMP points means to select different number of CoMP points. The number of the CoMP points, N, is a numerical value ranging from "1 to $N_{max}$", where the maximum value $N_{max}$ of the CoMP point may be pre-decided.

The scheduler 324 ranks the calculated metrics RB by RB. Among the calculated metrics, the scheduler 324 finds and allocates the RB with the highest metric and regards its owner UE as the watched UE, also called the highest UE.

When the watched UE is a candidate CoMP UE, the scheduler 324 temporarily decides number of CoMP points based on this allocated RB only. The temporarily decided number of CoMP points is called $N_0$. Next, the scheduler 324 deletes the metrics assuming N unequal to $N_0$ in the metric ranking list and then finds out the unallocated RBs for the following allocation, whose highest metric is assuming N equal to $N_0$. Then, the scheduler 324 tries to allocate one more RB to the watched UE and adjust $N_0$ to achieve highest normalized sum rate of allocated RBs. The RBs are allocated one-by-one for a candidate CoMP UE and the $N_0$ is adjusted as followings.

Next, the scheduler 324 calculates $T(N_0)$ of all the allocated RBs based on the CQI assuming $N_0$ CoMP points. Further, the scheduler 324 calculates the sum rate $T(N_0-1)$ by using combined CQI when $N_0-1$ CoMP points are used for synchronous transmission on the allocated RBs of the watched UE. The scheduler 324 compares the calculated rate $T(N_0)$ and $T(N_0-1)$. If $N_0>1$ and the rate $T(N_0)<T(N_0-1)$, the scheduler updates $N_0=N_0-1$. This process will stop only if the maximum $T(N_0)$ is achieved. This recursive iteration process of resource allocation and CoMP point adjusting until all the RBs with highest metric belong to this watched UE is allocated and the number of CoMP points is also decided. Besides, CoMP points are decided too, since above process have already assumed combination of CoMP point.

The scheduler 324 performs the above-mentioned process until all the RBs are allocated or all UEs are allocated, where the candidate CoMP UEs have also decided their CoMP point(s).

The above-mentioned process is carried out cell-by-cell. After all cells have finished the above mentioned process, the scheduler 324 coordinates the resource allocation for the CoMP UEs. When a CoMP UE is allocated different RB(s) from its CoMP points, the scheduler 324 coordinates different owner UEs on this uncommonly allocated RB. One coordination method is to release the uncommonly allocated RB to another UE, who can be the UE with lower metric than the allocated UE in the metric ranking list of this RB. When a CoMP UE is not allocated the RB of CoMP points as a result of coordination, the scheduler will allocate the CoMP UE in the next scheduling time.

Figure 11:
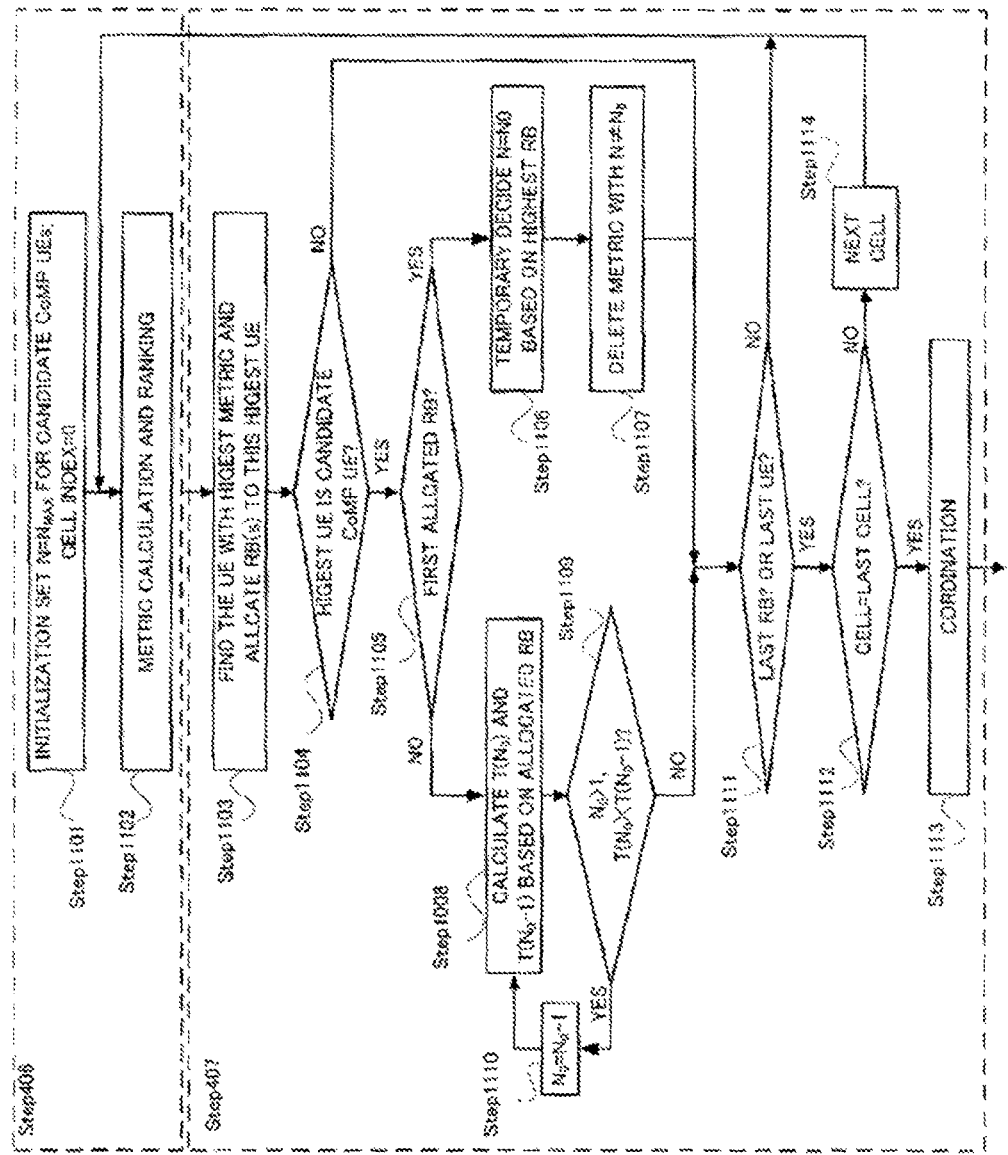
FIG. 11 shows a flowchart of Example 7.

An operation of this example is described below. For Example 7, the detailed flowchart of block 406 and 407 in the Step 404 is shown in FIG. 11 and described as follows. In block 406 of FIG. 11, there are two steps, step 1101 and 1102. In block 407 of FIG. 11, there are twelve steps, step 1103 to 1104.

In step 1101, the number of CoMP points of candidate CoMP UEs is initialized as $N=1{\sim}N_{max}$, while for other UEs, $N=1$. Here, the cell index starts from 0. The starts cell index is optional.

Next, in step 1102, the metric calculation and ranking use CQI of different UEs with initialized N CoMP points for channel-dependent scheduling. Here, the PF metric is explained in Math.1.

In step 1103, the scheduler firstly finds and allocates highest unallocated RB (the RB with highest metric) to the owner UE. This owner UE is also called the highest UE.

Then, in step 1104, the scheduler checks whether the highest UE is a candidate CoMP UE or not. If yes, go to step 1105; otherwise, go to step 1111.

In step 1105, when it is found that the allocated RB is the first allocated RB for the current candidate CoMP UE, go to step 1106; otherwise, go to step 1108.

In case of the first allocated RB, the step 1106 can temporarily decide $N=N_0$ to achieve highest metric. Before carrying out step 1111, the step 1107 deletes the UE's metric with N unequal to temporarily decided $N_0$ from the metric ranking list.

When the allocated RB is not the first one, in step 1108, the scheduler calculates the achievable normalized sum rate of this candidate CoMP based on CQI of all the allocated RB(s). $T(N)$ and $T(N-1)$ are calculated by assuming N and $N-1$ CoMP points, respectively. Next, the step 1109 compares $T(N)$ and $T(N-1)$ and checks whether $N>1$ and $T(N)<T(N-1)$ or not.

If yes, go to step 1110, where $N_0$ is decreased as $N_0=N_0-1$; otherwise, go to step 1111. Accordingly, $N_0$ is decided to achieve highest normalized sum rate of all allocated RBs. After the point decision, the step 1111 checks whether all RBs or UEs are allocated.

If yes, go to step 1112; otherwise, go to step 1102 in block 406 to update the metric ranking. After the resource allocation and point decision have been completed in the current cell, the step 1112 checks whether the current cell is the last cell.

If yes, go to step 1113; otherwise, go to step 1114 to move to the next cell and then go to step 1102 in block 406 to calculate and rank the metrics of the UEs belong to the cell. In step 1113, the coordination after resource allocation for each cell is carried out. For each CoMP UE, if the allocated RB is not commonly allocated at each CoMP point, the scheduler will replace the owner of this RB by the next UE with lower metric. The output of step 1113 is the information about allocated RBs for each UE.

Making a configuration like this example enables to improve both average sector throughput and cell-edge user throughput.

Example 8

The example 8 is explained below. The scheduler 324 in the example 8 will be explained. The explanation of a configuration similar to that of the above-mentioned example is omitted.

The scheduler 324 calculates the metric of each RB of all UEs. For a candidate CoMP UE, the metrics are calculated by using the CQI assuming $N=1$.

The scheduler 324 ranks the calculated metrics RB by RB.

Among the calculated metrics, the scheduler 324 finds and allocates the RB with the highest metric and regards its owner UE as the watched UE, also called the highest UE.

When the watched UE is a candidate CoMP UE, the scheduler 324 firstly calculates $T(N=1)$ of the watched UEs based on the CQI assuming $N=1$ CoMP point. Further, the scheduler 324 calculates $T(N+1)$ by using combined CQI when $N+1$ CoMP points are used for synchronous transmission on the allocated RBs of the watched UE. The scheduler 324 compares the calculated $T(N=1)$ and $T(N+1)$. If $T(N+1)>T(N)$, the scheduler increases N as $N=N+1$. This iteration process will stop only if the maximum $T(N_0)$ is achieved. Therefore, N is temporally decided as $N_0$. Next, the scheduler 324 updates the metric ranking list by using metric $N=N_0$ for the watched UE and then finds out the unallocated RBs with the highest metric belongs to the watched UE. Then, the scheduler 324 tries to allocate one more RB to the watched UE and adjust $N_0$ to achieve highest sum rate of allocated RBs. The RBs are allocated one-by-one for a candidate CoMP UE and the $N_0$ is adjusted as followings.

Next, the scheduler 324 calculates $T(N_0)$ of the allocated RBs based on the CQI assuming $N_0$ CoMP points. Further, the scheduler 324 calculates $T(N_0-1)$ by using combined CQI when $N_0-1$ CoMP points are used for synchronous transmission on the allocated RBs of the watched UE. The scheduler 324 compares the calculated $T(N_0)$ and $T(N_0-1)$. If $N_0>1$ and $T(N_0)<T(N_0-1)$, the scheduler updates $N_0=N_0-1$. This process will stop only if the maximum normalized sum rate is achieved. This recursive iteration process of resource allocation and CoMP point adjusting until all the RBs with highest metric belong to this watched UE is allocated and the number of CoMP points is also decided. Besides, CoMP points are decided too, since above process have already assumed combination of CoMP point.

The scheduler 324 performs the above-mentioned process until all the RBs are allocated or all UEs are allocated, where the candidate CoMP UEs have also decided their CoMP point(s).

The above-mentioned process is carried out cell-by-cell. After all cells have finished the above mentioned process, the scheduler 324 coordinates the resource allocation for the CoMP UEs. When a CoMP UE is allocated different RB(s) from its CoMP points, the scheduler 324 coordinates different owner UEs on this uncommonly allocated RB. One coordination method is to release the uncommonly allocated RB to another UE, who can be the UE with lower metric than the allocated UE in the metric ranking list of this RB. When a CoMP UE is not allocated the RB of CoMP points as a result of coordination, the scheduler will allocate the CoMP UE in the next scheduling time.

Figure 12:
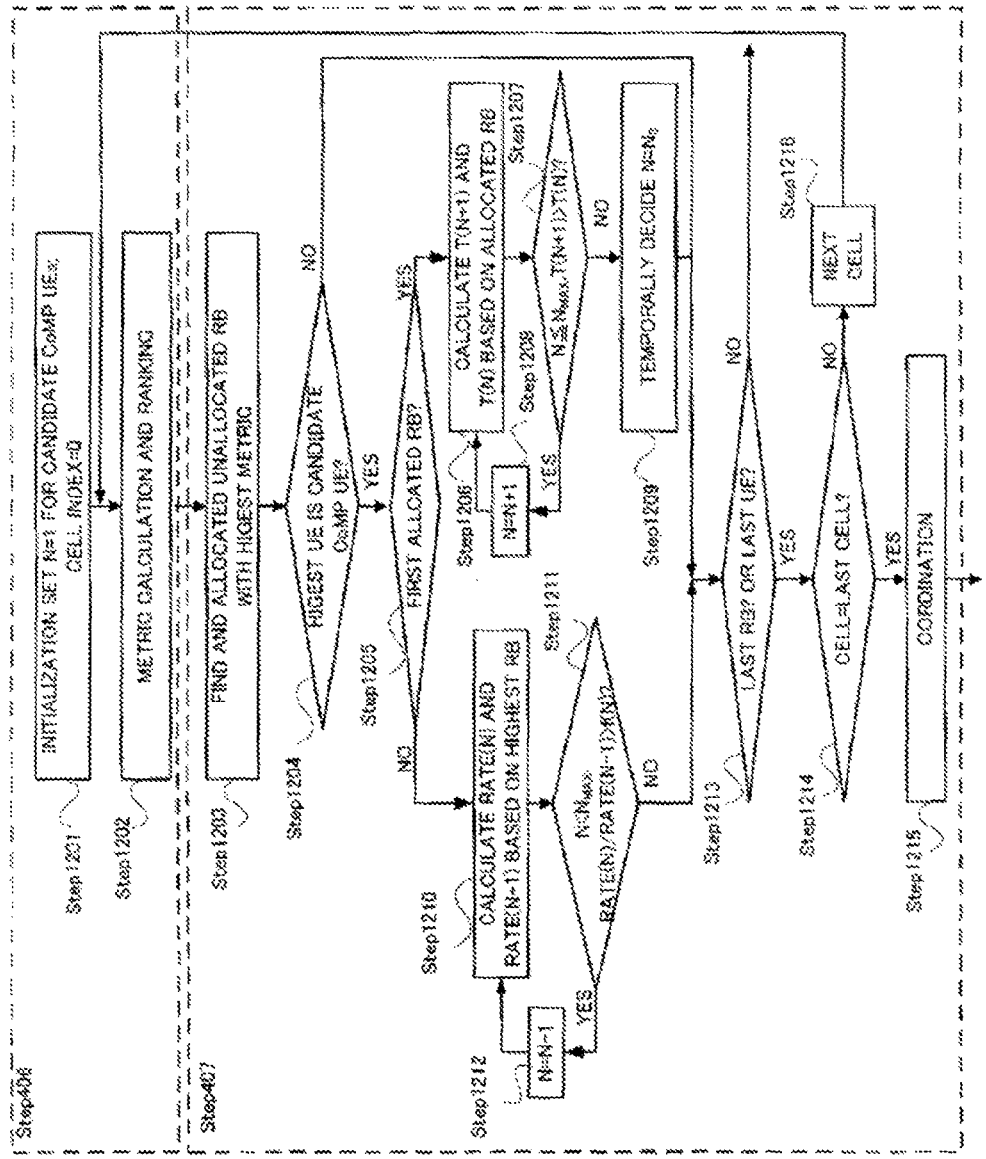
FIG. 12 shows a flowchart of Example 8.

An operation of this example is described below. For Example 8, the detailed flowchart of block 406 and block 407 in the Step 404 is shown in FIG. 12 and described as follows. In block 406 of FIG. 12, there are two steps, step 1201 and 1202. In block 407 of FIG. 12, there are thirty steps, step 1203 to 1215.

In step 1201, the number of CoMP points of candidate CoMP UEs is initialized as N=1 and the cell index starts from 0. The starts cell index is optional.

Next, in step 1202, the metric calculation and ranking use CQI of different UEs with initialized N=1 CoMP points for channel-dependent scheduling. Here, the PF metric is explained in Math. 1.

In step 1203, the scheduler finds and allocates highest RB (the RB with highest PF) to the owner UE. This owner UE is also called the highest UE.

Then, in step 1204, the scheduler checks whether the highest UE is a candidate CoMP UE or not. If yes, go to step 1205; otherwise, go to step 1213.

In step 1205, when it is found that the allocated RB is the first allocated RB for the current candidate CoMP UE, go to step 1206; otherwise, go to step 1210.

In case of the first allocated RB, in step 1206, the scheduler calculates the achievable normalized sum rate of this candidate CoMP based on CQI of this firstly allocated RB. T(N) and T(N+1) are calculated by assuming N and N+1 CoMP points, respectively. Next, the step 1207 compares T(N) and T(N+1) and checks whether $N<N_{MAX}$ and T(N+1)>T(N) or not. If yes, go to step 1208, where N is increased as N=N+1; otherwise, N is temporally decided as $N_0$ in step 1209.

When the allocated RB is not the first one, the step 1210 calculates the achievable normalized sum rate of this candidate CoMP based on CQI of all the allocated RBs. $T(N_0)$ and $T(N_0-1)$ are calculated by assuming $N_0$ and $N_0-1$ CoMP points, respectively. Next, the step 1211 compares $T(N_0)$ and $T(N_0-1)$ and checks whether $N_0>1$ and $T(N_0)<T(N_0-1)$ or not. If yes, go to step 1212, where $N_0$ is decreased as $N_0=N_0-1$; otherwise, go to step 1213.

Accordingly, the number of CoMP points is decided. After the point decision as well as resource allocation, the step 1213 checks whether all RBs or UEs are allocated. If yes, go to step 1214; otherwise, go to step 1202 in block 406 to update the metric ranking. After the resource allocation and point decision have been completed in the current cell, the step 1214 checks whether the current cell is the last cell.

If yes, go to step 1215; otherwise, go to step 1216 to move to the next cell and then go to step 1202 in block 406 to calculate and rank the metrics of the UEs belong to the cell. In step 1215, the coordination after resource allocation for each cell is carried out. For each CoMP UE, if the allocated RB is not commonly allocated at each CoMP point, the scheduler will replace the owner of this RB by the next UE with lower metric. The output of step 1215 is the information about allocated RBs for each UE.

Making a configuration like this example enables to improve both average sector throughput and cell-edge user throughput.

Example 9

The scheduler 324 in the example 9 will be explained. The explanation of a configuration similar to that of the above-mentioned example is omitted.

The scheduler 324 calculates the metric of each RB of the UE by assuming that the number of CoMP points is simply initialized as single point, i.e., $N=N_{max}$ ($N_{max}$: maximum number of CoMP points) for candidate CoMP UEs but N=1 for other non-CoMP UE.

The scheduler 324 calculates the metrics of all UEs on each RBs and ranks the calculated metrics RB by RB.

Among the allocated RBs, the scheduler 324 finds and allocates the RB with highest metric and regards its owner UE as the watched UE, also called the highest UE.

When the watched UE is a candidate CoMP UE, the scheduler 324 calculates $T(N=N_{max})$ of the watched UEs based on the CQI assuming $N_{max}$ CoMP point. Further, the scheduler 324 calculates T(N−1) by using combined CQI when N−1 CoMP points are used for synchronous transmission on the allocated RBs of the watched UE. The scheduler 324 compares the calculated T(N) and T(N−1). If N>1 and T(N)<T(N−1), the scheduler updates N=N−1. This process will stop only if the maximum $T(N_0)$ is achieved. Therefore, N is temporally decided as $N_0$. Then, the scheduler 324 tries to allocate one more RB to the watched UE and adjust $N_0$ to achieve highest normalized sum rate of allocated RBs. The RBs are allocated one-by-one for a candidate CoMP UE and the $N_0$ is adjusted as followings.

Next, the scheduler 324 calculates $T(N_0)$ of the allocated RBs based on the CQI assuming $N_0$ CoMP points. Further, the scheduler 324 calculates $T(N_0-1)$ by using combined CQI when $N_0-1$ CoMP points are used for synchronous transmission on the allocated RBs of the watched UE. The scheduler 324 compares the calculated rate $T(N_0)$ and $T(N_0-1)$. If $N_0>1$ and $T(N_0)<T(N_0-1)$, the scheduler updates $N_0=N_0-1$. This process will stop only if the maximum normalized sum rate is achieved. This recursive iteration process of resource allocation and CoMP point adjusting until all the RBs with highest metric belong to this watched UE is allocated and the number of CoMP points is also decided. Besides, CoMP points are decided too, since above process have already assumed combination of CoMP point.

After CoMP point decision, the scheduler 324 releases the allocated RBs with metric of N unequal to $N_0$ of watched UE. In addition, the metric ranking is updated by deleting the metrics of the watched UE or calculating the metric as $N=N_0$.

The scheduler 324 performs the above-mentioned process until all the RBs are allocated or all UEs are allocated, where the candidate CoMP UEs have also decided their CoMP point(s).

The above-mentioned process is carried out cell-by-cell. After all cells have finished the above mentioned process, the scheduler 324 coordinates the resource allocation for the CoMP UEs. When a CoMP UE is allocated different RB(s) from its CoMP points, the scheduler 324 coordinates different owner UEs on this uncommonly allocated RB. One coordination method is to release the uncommonly allocated RB to another UE, who can be the UE with lower metric than the allocated UE in the metric ranking list of this RB. When a CoMP UE is not allocated the RB of CoMP points as a result of coordination, the scheduler will allocate the CoMP UE in the next scheduling time.

An operation of this example is described below. For Example 9, the detailed flowchart of block 406 and block 407 in the Step 404 is shown in FIG. 13 and described as follows.

In step 1301, the number of CoMP points is initialized as $N=N_{max}$ and the cell index starts from 0. Next, in step 1302, the metric calculation and ranking use CQI assuming initialized $N=N_{max}$ CoMP points for channel-dependent scheduling. Here, the PF metric is explained in Math. 1.

Figure 13:
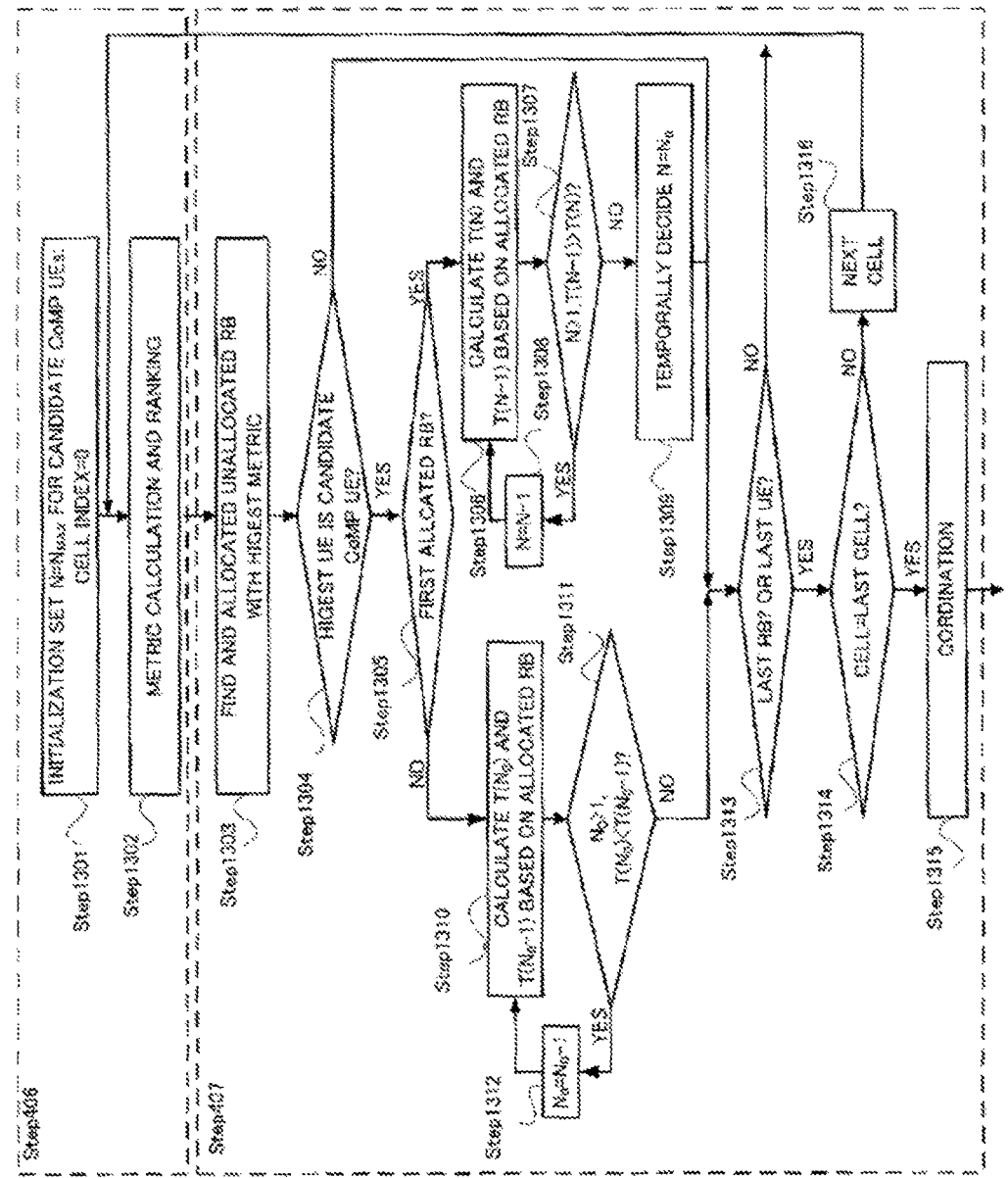
FIG. 13 shows a flowchart of Example 9.

In block 407 of FIG. 13, the step 1303 finds and allocates highest RB (the RB with highest PF) to the owner UE. This owner UE is also called the highest UE.

Then, in step 1304, the scheduler checks whether the highest UE is a candidate CoMP UE or not. If yes, go to step 1305; otherwise, go to step 1313.

In step 1305, when it is found that the allocated RB is the first allocated RB for the current candidate CoMP UE, go to step 1306; otherwise, go to step 1310.

In case of the first allocated RB, in step 1306, the scheduler calculates the achievable normalized sum rate of this candidate CoMP based on CQI of this firstly allocated RB. T(N) and T(N−1) are calculated by assuming N and N−1 CoMP points, respectively. Next, the step 1307 compares T(N) and T(N−1) and checks whether N>1 and T(N)<T(N−1) or not. If yes, go to step 1208, where N is decreased as N=N−1; otherwise, N is temporally decided as $N_0$ in step 1309.

When the allocated RB is not the first one, the step 1310 calculates the achievable normalized sum rate of this candidate CoMP based on CQI of all the allocated RBs. $T(N_0)$ and $T(N_0-1)$ are calculated by assuming $N_0$ and $N_0-1$ CoMP points, respectively. Next, the step 1311 compares $T(N_0)$ and $T(N_0-1)$ and checks whether $N_0>1$ and $T(N_0)<T(N_0-1)$ or not. If yes, go to step 1312, where $N_0$ is decreased as $N_0=N_0-1$; otherwise, go to step 1313.

Accordingly, the number of CoMP points is decided. Then, CoMP points are decided too. After the point decision as well as resource allocation, the step 1313 checks whether all RBs or UEs are allocated. If yes, go to step 1314; otherwise, go to step 1302 in block 406 to update the metric ranking. After the resource allocation and point decision have been completed in the current cell, the step 1314 checks whether the current cell is the last cell.

If yes, go to step 1315; otherwise, go to step 1316 to move to the next cell and then go to step 1302 in block 406 to calculate and rank the metrics of the UEs belong to the cell. In step 1315, the coordination after resource allocation for each cell is carried out. For each CoMP UE, if the allocated RB is not commonly allocated at each CoMP point, the scheduler will replace the owner of this RB by the next UE with lower metric. The output of step 1315 is the information about allocated RBs for each UE.

Making a configuration like this example enables to improve both average sector throughput and cell-edge user throughput.

For Example 1~9, the Step 402 in the flowchart of FIG. 4 can be implemented in two different ways. One simple way is to use same Step 402 as the Step 2 302 of conventional method, as illustrated in FIG. 3 300. In this case, the serving cell is defined as the cell with largest RSRP [1]. In this case, Step 402 only use the result of Step 401 to get cell ranking according to geometry, RSRP or RSRQ. The serving cell is always selected as a CoMP point.

Another way is different from conventional method, that is, to dynamically update cell ranking by using previously allocated results by using the results of Step 402 and Step 404 in FIG. 4. The scheduling results in previous subframe are required to update cell ranking in current subframe. When the instantaneous received quality of serving cell is getting worse, the serving cell may not be selected as a CoMP point for current CoMP joint transmission. Therefore, serving cell serving cell is not always selected as a CoMP point.

Above mention is explained by employing the case that communication scheme is LTE in 3GPP. The communication scheme is not limited hereto, and the communication scheme can be for example WiMAX or wireless communication system etc.

Additionally, above mention is employing the case that scheduler ranks by calculating PF metric. That is not limited hereto, and the scheduler can ranks by using QoS, CQI of receiving, or spectrum efficiency etc.

Furthermore, above mention is a configuration which of carrying out deciding CoMP point in the eNodeB. That is not limited hereto, and a coordinator can receive all necessary information and carry out.

In addition, decision of CoMP point process may perform it for every scheduling time or a previously fixed period.

The present invention can be applied to up link and down link.

The invention claimed is:

1. A wireless communication system, characterized in deciding a number of CoMP (coordinated multipoint transmission and reception) points to a user equipment (UE) by using information related to scheduling;
   wherein:
      the number of CoMP points to the UE is decided based on a rate of resource blocks allocated in accordance with scheduling conducted by assuming part or all of combinations of CoMP points; and
      a CoMP point is a point involved in coordinated transmission and reception to the UE.

2. The wireless communication system according to claim 1, characterized in allocating resource blocks to the UE by using ranking of said information related to scheduling.

3. The wireless communication system according to claim 2, wherein said number of CoMP points is decided based on a sum rate of said allocated resource blocks.

4. The wireless communication system according to claim 1, wherein said number of CoMP points is further decided based on ranking of said information related to scheduling.

5. The wireless communication system according to claim 4, characterized in allocating resource blocks to the UE based on said decided number of CoMP points.

6. The wireless communication system according to claim 1, said wireless communication system characterized in:
   deciding the supposing number of CoMP points based on ranking of said information related to scheduling;
   allocating resource blocks the UE based on said decided supposing number of CoMP points; and
   deciding said number of CoMP points based on a sum rate of said allocated resource blocks.

7. A base station, characterized in deciding number of CoMP (coordinated multipoint transmission and reception) points to a user equipment (UE) by using information related to scheduling:
   wherein:
      the number of CoMP points to the UE is decided based on a rate of resource blocks allocated in accordance with scheduling conducted by assuming or all of combinations of CoMP points; and
      a CoMP point is a point involved in coordinated transmission and reception to the UE.

8. The base station according to claim 7, characterized in allocating resource blocks to the UE by using ranking of said information related to scheduling.

9. The base station according to claim 8, wherein said number of CoMP points is decided based on a sum rate of said allocated resource blocks.

10. The base station according to claim 7, wherein said number of CoMP points is further decided based on ranking of said information related to scheduling.

11. The base station according to claim 10, characterized in allocating resource blocks to the UE based on said decided number of CoMP points.

12. The base station according to claim 7, said base station characterized in:
deciding the supposing number of CoMP points based on ranking of said information related to scheduling;
allocating resource blocks the UE based on said decided supposing number of CoMP points; and
deciding said number of CoMP points based on a sum rate of said allocated resource blocks.

13. A user equipment, characterized in communicating to use decided number of CoMP (coordinated multipoint transmission and reception) points based on using information related to scheduling by abuse station;
wherein:
the number of CoMP points is decided based on a rate of resource blocks allocated in accordance with scheduling by the base station conducted by assuming part or all of combinations of CoMP points; and
a CoMP point is a point involved in coordinated transmission and reception to a user equipment (UE).

14. A coordinator, characterized in deciding number of CoMP (coordinated multipoint transmission and reception) points to a user equipment (UE) by using information related to scheduling:
wherein:
the number of CoMP points to the UE is decided based on a rate of resource blocks allocated in accordance with scheduling conducted by assuming part or all of combinations of CoMP points; and
a CoMP point is a point involved in coordinated transmission and reception to the UE.

15. A wireless communication method, characterized in deciding number of CoMP (coordinated multipoint transmission and reception) points to a user equipment (UE) by using information related to scheduling:
wherein:
the number of CoMP points to the UE is decided based on a rate of resource blocks allocated in accordance with scheduling conducted by assuming part or all of combinations of CoMP points; and
a CoMP point is a point involved in coordinated transmission and reception to the UE.

16. The wireless communication method according to claim 15, characterized in allocating resource blocks to the UE by using ranking of said information related to scheduling.

17. The wireless communication method according to claim 16, wherein said number of CoMP points is decided based on a sum rate of said allocated resource blocks.

18. The wireless communication method according to claim 15, wherein said number of CoMP points is further decided based on ranking of said information related to scheduling.

19. The wireless communication method according to claim 18, characterized in allocating resource blocks to the UE based on said decided number of CoMP points.

20. The wireless communication method according to claim 15, said wireless communication method characterized in:
deciding the supposing number of CoMP points based on ranking of said information related to scheduling;
allocating resource blocks the UE based on said decided supposing number of CoMP points; and
deciding said number of CoMP points based on a sum rate of said allocated resource blocks.

21. A non-transitory computer readable recording medium storing a communication program, said program causing a computer to execute: deciding number of CoMP (coordinated multipoint transmission and reception) points to a user equipment (UE) by using information related to scheduling;
wherein:
the number of CoMP points to the UE is decided based on a rate of resource blocks allocated in accordance with scheduling conducted by assuming part or all of combinations of CoMP points; and
a CoMP point is a point involved in coordinated transmission and reception to the UE.

22. A non-transitory computer readable recording medium storing a communication program, said program causing a computer to execute: communicating to use decided number of CoMP (coordinated multipoint transmission and reception) points based on using information related to scheduling by a base station;
wherein:
the number of CoMP points is decided based on a rate of resource blocks allocated in accordance with scheduling by the base station conducted by a assuming part or all of combinations of CoMP points; and
a CoMP point is a point involved in coordinated transmission and reception to a UE.

* * * * *

UNITED STATES PATENT AND TRADEMARK OFFICE
CERTIFICATE OF CORRECTION

PATENT NO.         : 9,014,711 B2
APPLICATION NO.    : 13/496175
DATED              : April 21, 2015
INVENTOR(S)        : Le Liu and Yoshikazu Kakura Page 1 of 1

It is certified that error appears in the above-identified patent and that said Letters Patent is hereby corrected as shown below:

Claims

Column 22, Line 58: In Claim 7, delete "assuming or" and insert -- assuming part or --

Column 23, Line 19: In Claim 13, delete "abuse" and insert -- a base --

Column 24, Line 44: In Claim 22, delete "by a assuming" and insert -- by assuming --

Signed and Sealed this
Twenty-fourth Day of November, 2015

Michelle K. Lee
*Director of the United States Patent and Trademark Office*